United States Patent
Tatsukami

(10) Patent No.: US 7,733,656 B2
(45) Date of Patent: Jun. 8, 2010

(54) HEAT SINK UNIT, CIRCUIT BOARD UNIT, AND ELECTRONIC DEVICE

(75) Inventor: Ikki Tatsukami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/379,540

(22) Filed: Feb. 24, 2009

(65) Prior Publication Data

US 2009/0303683 A1      Dec. 10, 2009

(30) Foreign Application Priority Data

Jun. 10, 2008   (JP) .............................. 2008-152200

(51) Int. Cl.
  *H05K 7/20*   (2006.01)
(52) U.S. Cl. .................. 361/719; 361/690; 361/695; 361/697; 174/16.1; 174/16.3; 165/80.3; 165/122
(58) Field of Classification Search ................ 361/690, 361/694, 695; 165/80.3; 174/16.1, 16.3
See application file for complete search history.

(56) References Cited

U.S. PATENT DOCUMENTS

| | | | |
|---|---|---|---|
| 6,023,413 A | | 2/2000 | Umezawa |
| 6,442,025 B2* | | 8/2002 | Nakamura et al. .......... 361/695 |
| 6,606,254 B2* | | 8/2003 | Yoneda ...................... 361/799 |
| 6,654,247 B1* | | 11/2003 | Lee ............................. 361/697 |
| 6,671,177 B1* | | 12/2003 | Han ............................ 361/719 |
| 6,738,254 B2* | | 5/2004 | Oogami .................. 361/679.08 |
| 6,765,794 B1* | | 7/2004 | Inoue ......................... 361/695 |
| 7,184,265 B2* | | 2/2007 | Kim et al. ............... 361/679.47 |
| 7,397,666 B2* | | 7/2008 | Barsun et al. ............... 361/719 |
| 7,580,265 B2* | | 8/2009 | Kumagai et al. ........... 361/719 |

FOREIGN PATENT DOCUMENTS

| | | |
|---|---|---|
| EP | 0 856 888 A2 | 8/1998 |
| JP | 10-70383 | 3/1998 |
| JP | 10-223816 | 8/1998 |

* cited by examiner

*Primary Examiner*—Boris L Chervinsky
(74) *Attorney, Agent, or Firm*—Staas & Halsey LLP

(57) ABSTRACT

A heat sink unit includes: a cooling member including a metal plate having a plurality of attachment holes on edges thereof, a first surface of the metal plate adjoining a heat-producing electronic component, and a second surface of the metal plate having a plurality of cooling fins erected on an area other than the attachment holes. The heat sink unit further includes: an attachment member including an opening in which the cooling fins are disposed when the cooling member is installed and a plurality of threaded bosses protruding from the first surface to be inserted into each of the attachment holes; and coil springs into which the bosses are respectively inserted. The coil springs are interposed between the attachment member and the metal plate, and the bosses are inserted into the attachment holes to fix the cooling member by screws.

8 Claims, 30 Drawing Sheets

HEAT SINK UNIT, CIRCUIT BOARD UNIT, AND ELECTRONIC DEVICE

CROSS-REFERENCE TO RELATED APPLICATION

This application is based upon and claims the benefit of priority of the prior Japanese Patent Application No. 2008-152200, filed on Jun. 10, 2008, the entire contents of which are incorporated herein by reference.

FIELD

The embodiment discussed herein is related to a heat sink unit used to cool heat-producing electronic component, a circuit board unit having a circuit board on which the heat-producing electronic component and the heat sink unit are mounted, and an electronic device having the circuit board unit.

BACKGROUND

For example, a personal computer (hereinafter, referred to as a "PC") internally has a circuit board on which a heat-producing electronic component such as a CPU is mounted, and a heat sink unit abutted on the heat-producing electronic component for cooling the heat generated from the heat-producing electronic components is also mounted on the heat sink unit. In some heat sink units, elasticity against the heat-producing electronic component is added to alleviate a difference of heights of the heat-producing electronic components and provide sufficient an abutting force against the heat-producing electronic component.

Japanese Laid-open Patent Publication No. 10-223816 discloses a structure having an attachment clamp for mounting the heat sink on the circuit board and a spring interposed between the heat sink and the attachment clamp to apply elasticity between the heat sink and the heat-producing electronic component. However, in this structure, an attachment component or a spring is separately prepared in addition to the heat sink unit, and thus, errors maybe frequently generated in an assembling process.

Also, Japanese Laid-open Patent Publication No. 10-70383 discloses a structure which applies elasticity between the heat sink and the heat-producing electronic component by inserting a coil spring between the screw head and the heat sink during a process of fixing the heat sink to the circuit board by screws.

However, even in this structure, the heat sink unit fails to have a structure for applying elasticity on its own. Since the coil spring is installed when the heat sink unit is attached to the circuit board, errors may frequently occur.

SUMMARY

According to an aspect of the invention, a heat sink unit includes:

a cooling member including a metal plate having a plurality of attachment holes on edges thereof, a first surface of the metal plate adjoining a heat-producing electronic component, and a second surface of the metal plate having a plurality of cooling fins erected on an area other than the attachment holes;

an attachment member including an opening in which the cooling fins are disposed when the cooling member is installed and a plurality of threaded bosses protruding from the first surface to be inserted into each of the attachment holes; and coil springs into which the bosses are respectively inserted, wherein the coil springs are interposed between the attachment member and the metal plate, and the bosses are inserted into the attachment holes to fix the cooling member by screws.

According to another aspect of the invention, a circuit board unit includes:

a circuit board;

a heat-producing electronic component which is mounted on the circuit board and produces heat by consuming electric power; and a heat sink unit which is fixed to the circuit board and emits the heat produced by the heat-producing electronic component, wherein the heat sink unit includes:

a cooling member including a metal plate having a plurality of attachment holes on edges thereof, a first surface of the metal plate adjoining a heat-producing electronic component, and a second surface of the metal plate having a plurality of cooling fins erected on an area other than the attachment holes;

an attachment member including an opening in which the cooling fins are disposed when the cooling member is installed and a plurality of threaded bosses protruding from the first surface to be inserted into each of the attachment holes; and coil springs into which the bosses are respectively inserted, and wherein the coil springs are interposed between the attachment member and the metal plate, and the bosses are inserted into the attachment holes to fix the cooling member by screws.

According to further another aspect of the invention, an electronic device includes:

a circuit board unit; and a casing which stores the circuit board unit, wherein the circuit board unit includes:

a circuit board, a heat-producing electronic component which is mounted on the circuit board and produces heat by consuming electric power, and a heat sink unit which is fixed to the circuit board and emits the heat produced by the heat-producing electronic component, wherein the heat sink unit includes:

a cooling member including a metal plate having a plurality of attachment holes on edges thereof, a first surface of the metal plate adjoining a heat-producing electronic component, and a second surface of the metal plate having a plurality of cooling fins erected on an area other than the attachment holes, an attachment member including an opening in which the cooling fins are disposed when the cooling member is installed and a plurality of threaded bosses protruding from the first surface to be inserted into each of the attachment holes, and coil springs into which the bosses are respectively inserted, and wherein the coil springs are interposed between the attachment member and the metal plate, and the bosses are inserted into the attachment holes to fix the cooling member by screws.

DESCRIPTION OF EMBODIMENTS

Hereinafter, embodiments of the present invention will be described.

Figure 1:
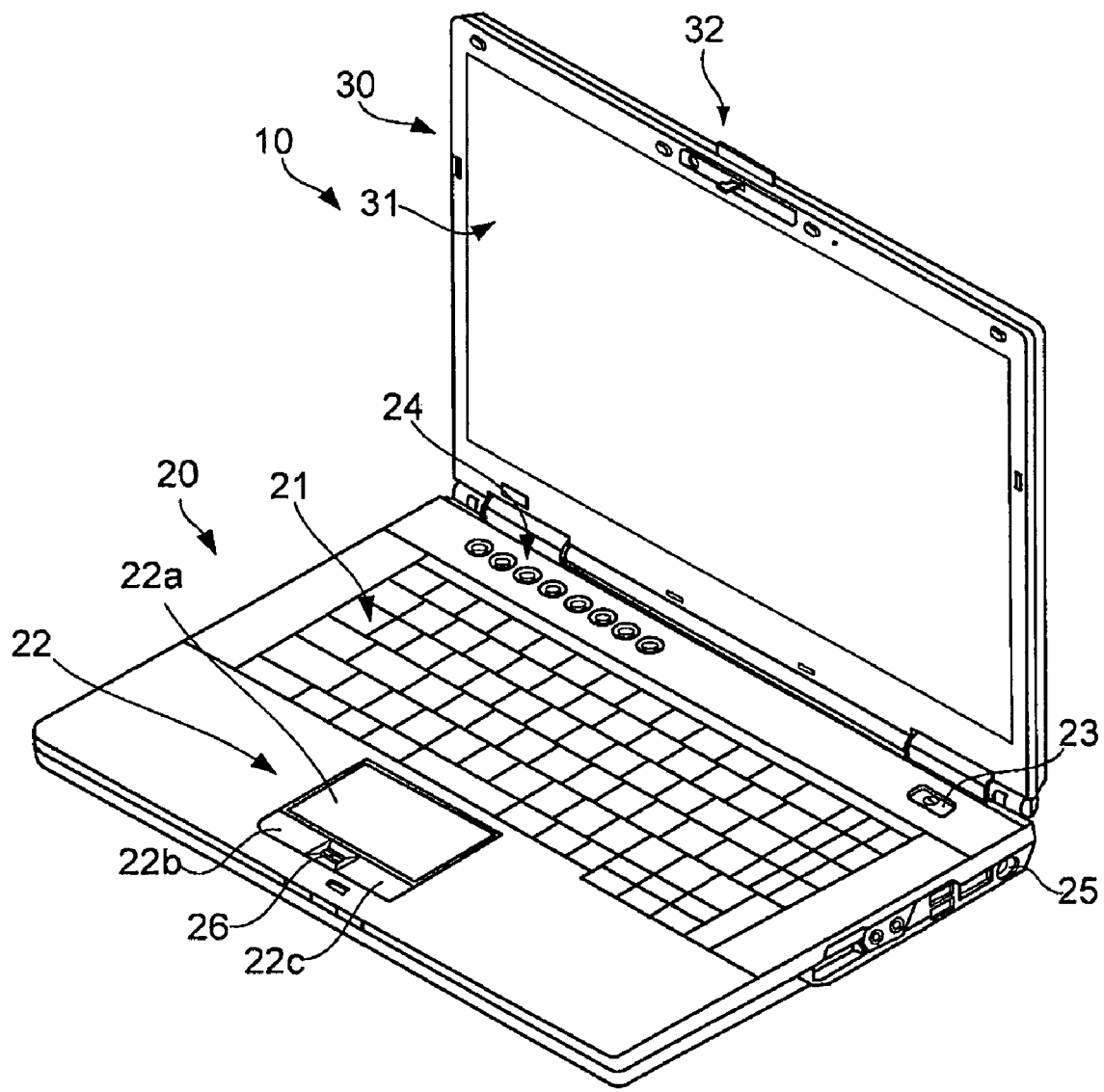
FIG. 1 is a perspective view illustrating appearance of a notebook computer (or a laptop computer) as an electronic device in an open position according to an embodiment of the present invention.
Figure 2:
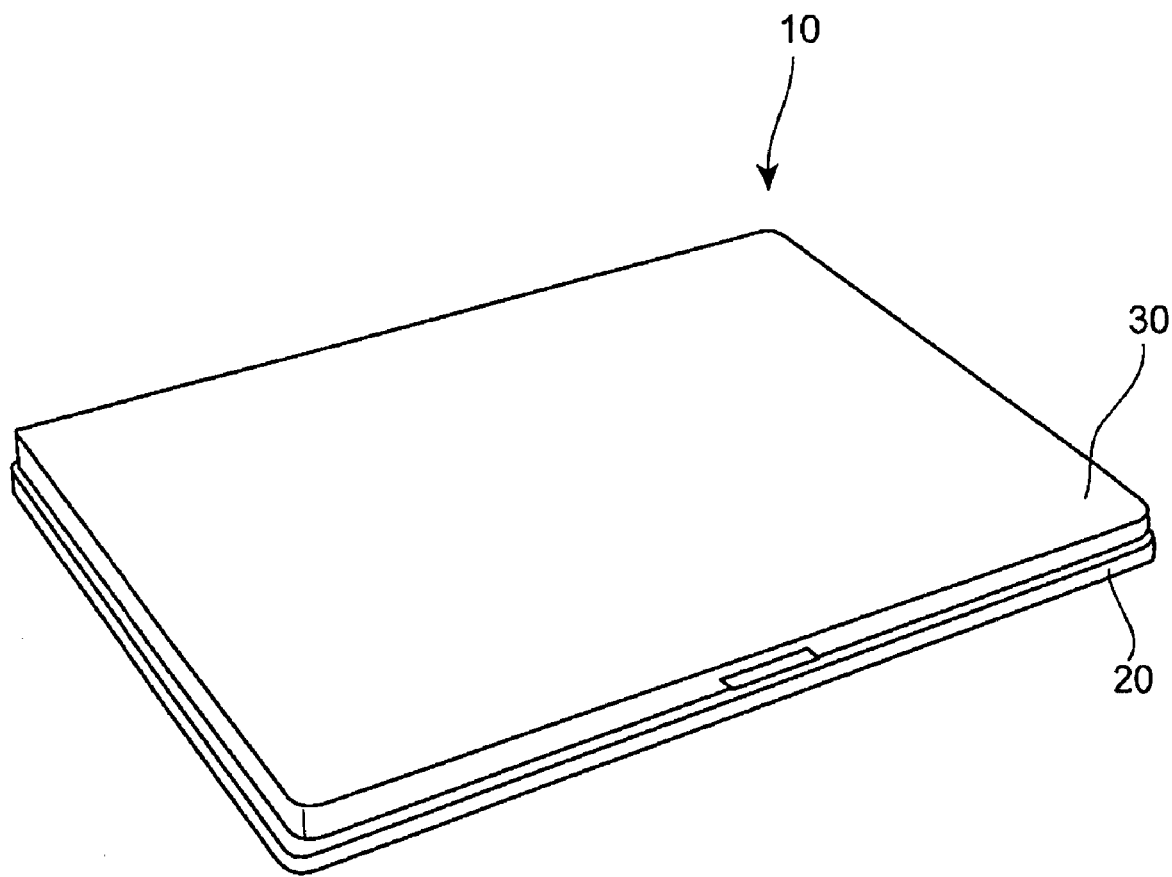
FIG. 2 is a perspective view illustrating appearance of a notebook computer (or a laptop computer) in a closed position according to the embodiment of the present invention.

FIGS. 1 and 2 are perspective views illustrating appearance of a notebook computer (or a laptop computer) as an electronic device in an open position and a closed position according to an embodiment of the present invention. The notebook computer 10 includes a main unit 20 and a display unit 30. The display unit 30 is connected to the main unit 20 by a hinge so as to be freely opened and closed.

The main unit 30 includes a keyboard set 21, a pointing device 22, a power button 23, and a variety of function buttons 24 on a top surface, and a power connector 25 connected to an AC adaptor and other connectors on side surfaces.

The display unit 30 is provided with a display screen 31 arranged on a surface facing the main unit 20 in a closed position of FIG. 2, and a locking mechanism 32 arranged in an upper center in an open position of FIG. 1 to prevent the display unit 30 from being erroneously opened from a closed position of FIG. 2. The pointing device 22 includes an electrostatic touch sensor 22a for detecting a touch position of a finger and left and right buttons 22b and 22c. The touch sensor 22a detects a movement locus of a finger and reflects the locus on the movement of the cursor on the display screen 31 when a user's finger touches the sensor 22a and makes movement. The touch sensor 22a corresponds to a mouse most widely used as a pointing device. Also, the left and right buttons 22b and 22c of the touch sensor 22a correspond to the left and right buttons of the mouse.

A fingerprint sensor 26 maybe provided in the center between the left and right buttons 22b and 22c to remove necessity of inputting passwords or the like.

(Pointing Device)

Figure 3:
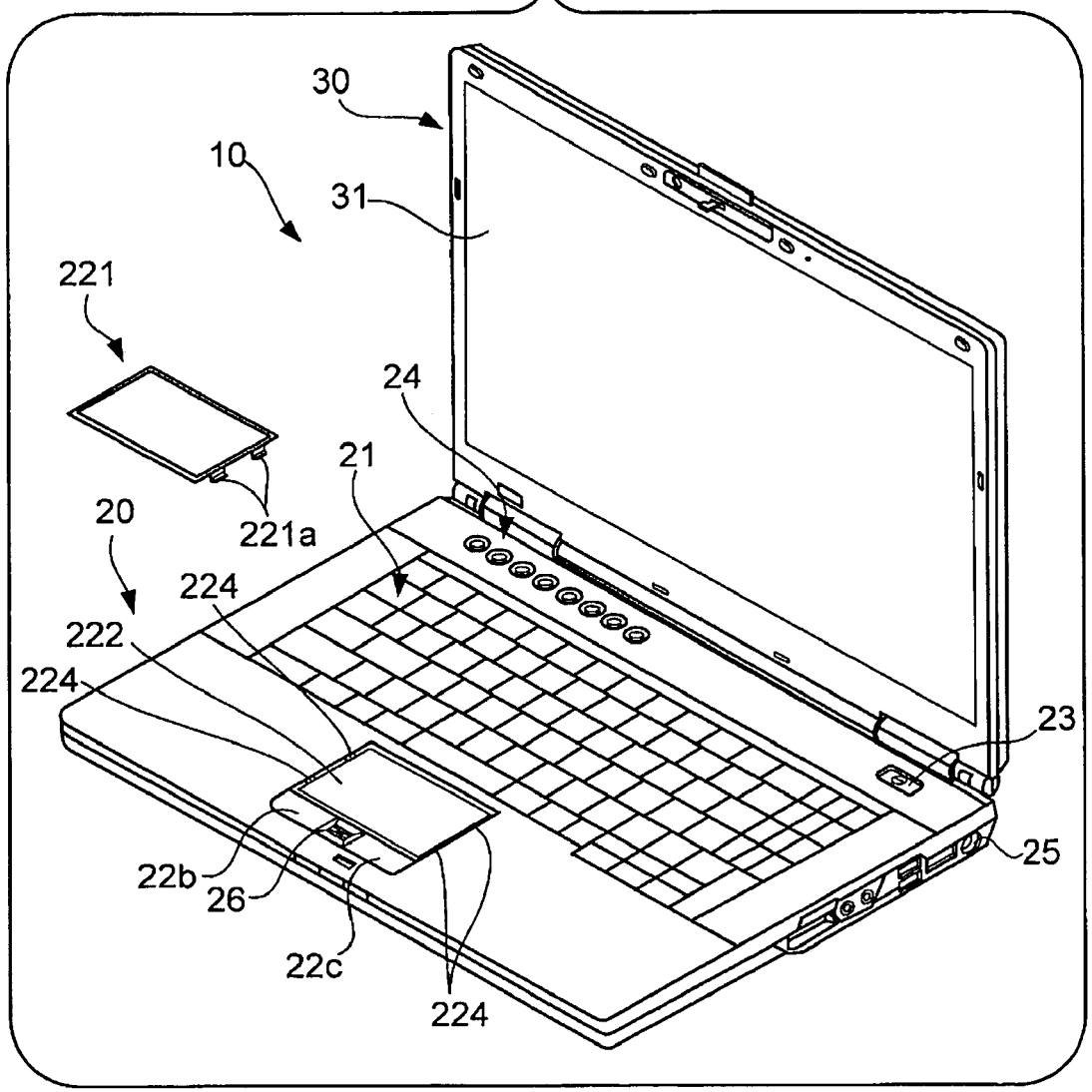
FIG. 3 is an exploded perspective view illustrating the notebook computer of FIG. 1 and FIG. 2 by removing a cover of a touch sensor from a main unit.
Figure 4:
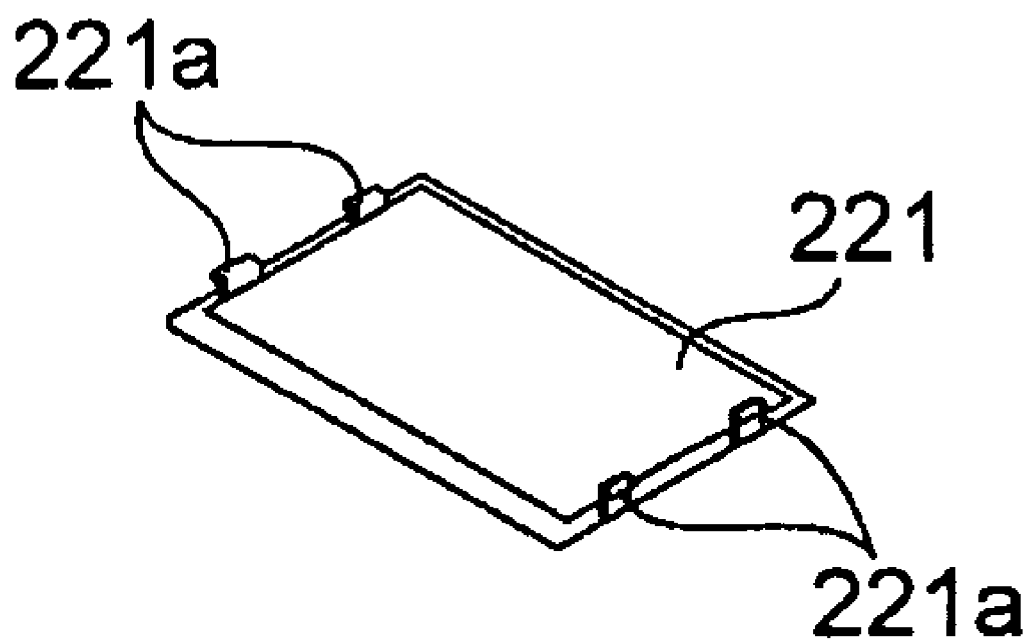
FIG. 4 is a perspective view illustrating a backside of the cover.
Figure 5:
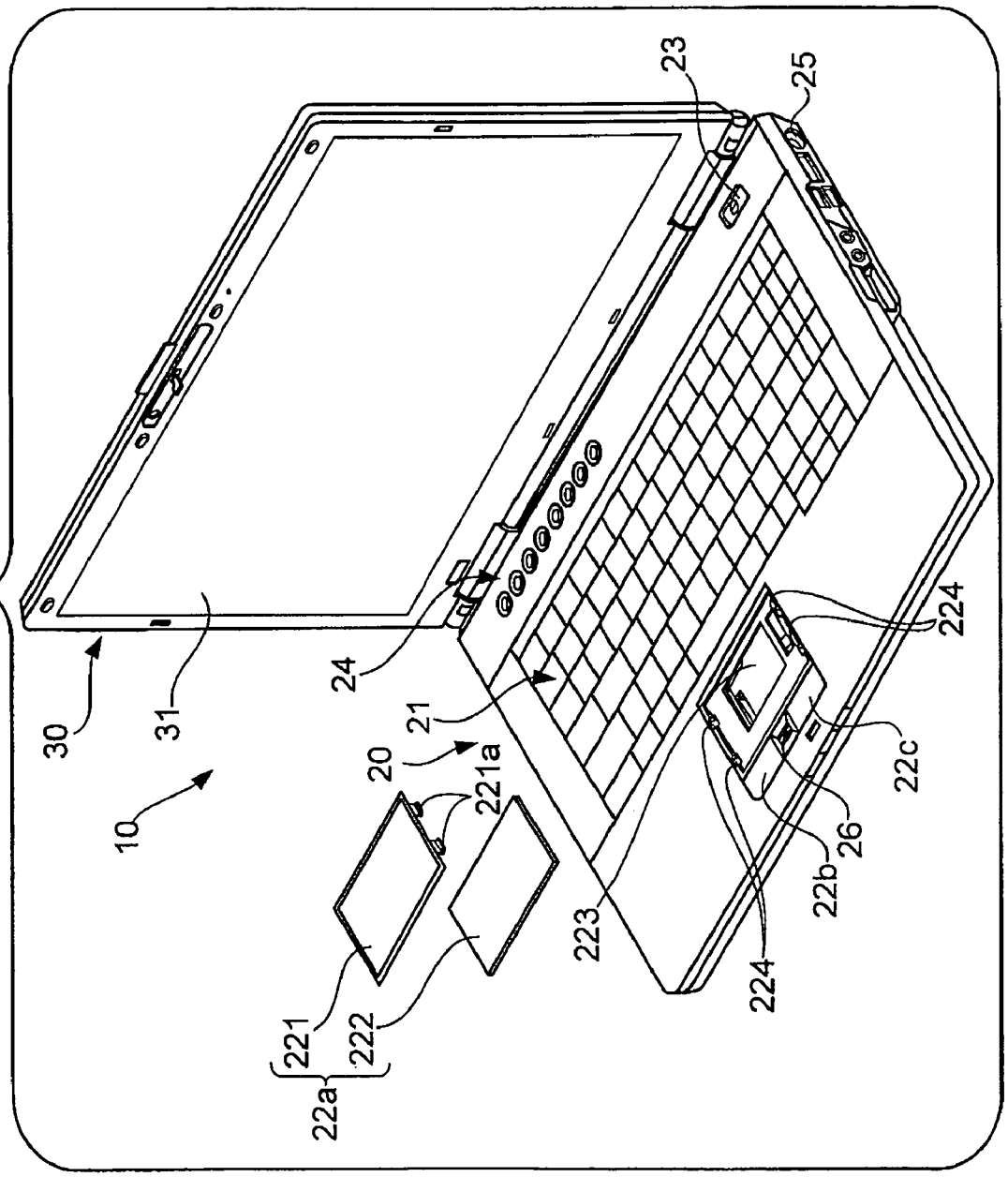
FIG. 5 is a partially exploded perspective view illustrating appearance of the notebook computer when the cover is removed and further a sensor board is removed.
Figure 6:
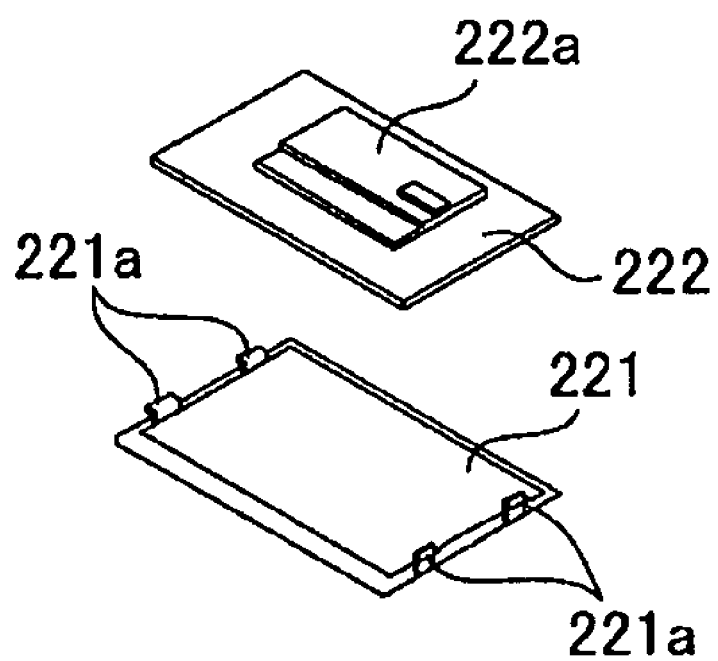
FIG. 6 is a perspective view illustrating backsides of the sensor board and the cover.

FIG. 3 is an exploded perspective view illustrating the same notebook computer as that of FIG. 1 or 2 with the cover of the touch sensor 22a being removed from the main unit. FIG. 4 is a perspective view illustrating a backside of the cover 221. FIG. 5 is a perspective view illustrating a notebook computer with the cover 221 and the sensor board 222 being removed. FIG. 6 is a perspective view illustrating backsides of the cover 221 and the sensor board 222.

The sensor board 222 has a sensor circuit 222a mounted on its backside as illustrated in FIG. 6. On the other hand, as illustrated in FIG. 5, the main unit 20 has an opening 223 opened toward both the inside and outside of the main unit 20 in a location where the sensor board 22 is to be disposed. The sensor board 222 is arranged to allow the sensor circuit 222a to be inserted into the opening 223. Edges of the sensor circuit 222a are adhered to edges of the opening 223 with a double-coated fixing tape. In addition, a cable (not illustrated in the drawing) is extended from the sensor circuit 222a and connected to the internal circuit through the opening 223. Although this sensor board 222 is adapted to detect a location of a finger touching its surface or a movement locus of a finger when the finger moves on its surface, the sensor board 222 may be adapted to detect a location of a finger just by closely approaching a finger to the surface without perfectly touching.

Therefore, in this case, the cover 221 is mounted on the sensor board 222, and the location of a finger is detected by disposing a finger on the cover 221. Two engagement claws 221a are formed on each of the left and right edges of the cover 221. The main unit 20 also has engagement holes 224, into which the engagement claws 221a are inserted into, on the left and right sides of a portion where the cover 221 is disposed. The engagement claws 221a of the cover 221 are engaged with the engagement holes 224 of the main unit 20 to allow the cover 221 to form a part of a top surface of a main unit casing. If preferably, the cover 221 may be adapted to be removed without using any tool. As a result, it is possible to provide a notebook computer of rich color design by preparing a variety of colors and shapes of the cover 221.

Figure 7:
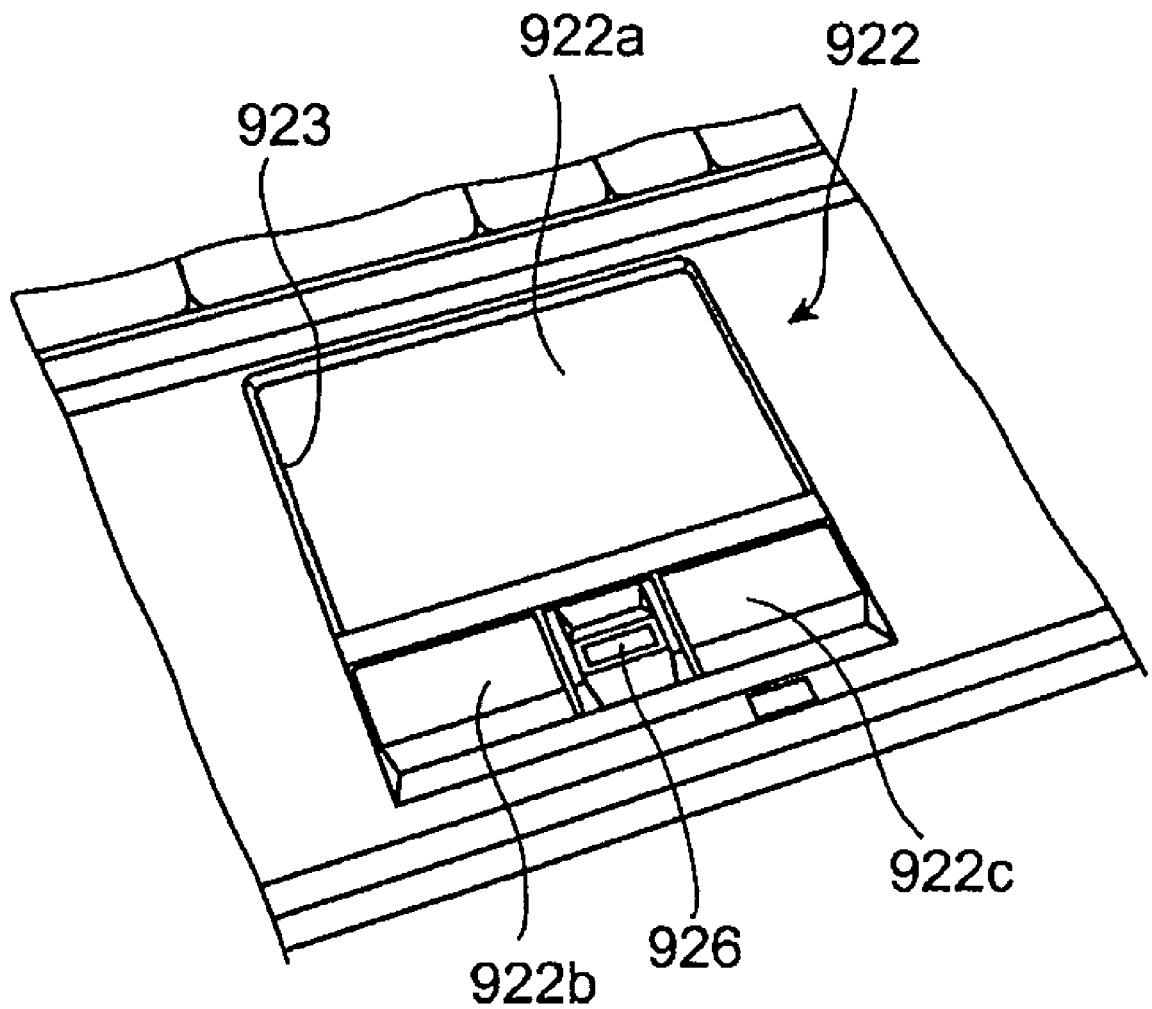
FIG. 7 is a perspective view illustrating a conventional pointing device.

FIG. 7 is a diagram illustrating a conventional pointing device 922.

The pointing device 922 illustrated in FIG. 7 as a comparative example includes an electrostatic touch sensor 922a, left and right buttons 922b and 922c, and a fingerprint sensor 926 disposed between the buttons 922b and 922c. Since the touch sensor 922a is disposed inside the opening 923 formed on the main unit casing, it is difficult to remove it. In addition, the touch sensor 922a is quite deeply disposed to an extent equal to the thickness of the main unit casing.

(Hinge Section Structure)

Figure 8:
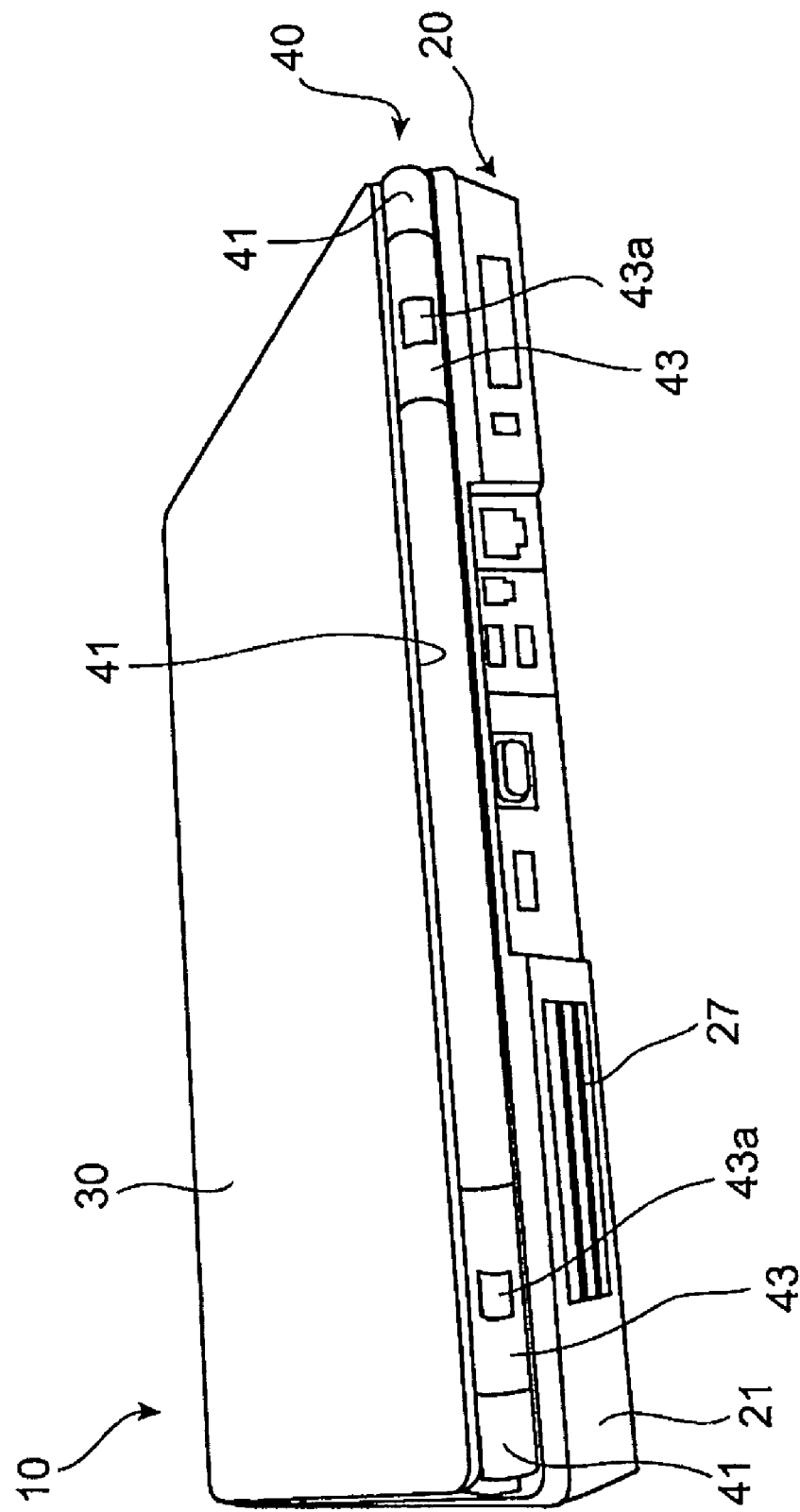
FIG. 8 is a perspective view illustrating a rear side of the notebook computer illustrated in FIG. 1 and FIG. 2 in the closed position.

FIG. 8 is a perspective view illustrating a rear side of the notebook computer of FIG. 1 or 2 in a closed position.

The notebook computer 10 has an air outlet 27 and other various connectors and components on a rear side of the main unit 20. Now, a structure of the hinge section 40 connecting the main unit 20 and the display unit 30 to each other will be described. The hinge section 40 is shaped like a single cylinder extending in a predetermined direction that is a longitudinal direction of the notebook computer 10 in this case. Looking at the cylindrical hinge section, a cylindrical rod section 41 is covered by remaining portions other than a pair of cover members 43 longitudinally separated and is inserted into apart of the display unit 30 casing (i.e., a bottom portion of the display unit 30 when the display unit 30 is open relative to the main unit 20, i.e., in an open position as illustrated in FIG. 1). Notch portions 42 (see FIG. 9) each formed by making a cut in the cylindrical shape are covered by a pair of cover members 43. Fastening elements for the cover members 43 are screws, and heads of the screws are covered by patches 43a.

Figure 9:
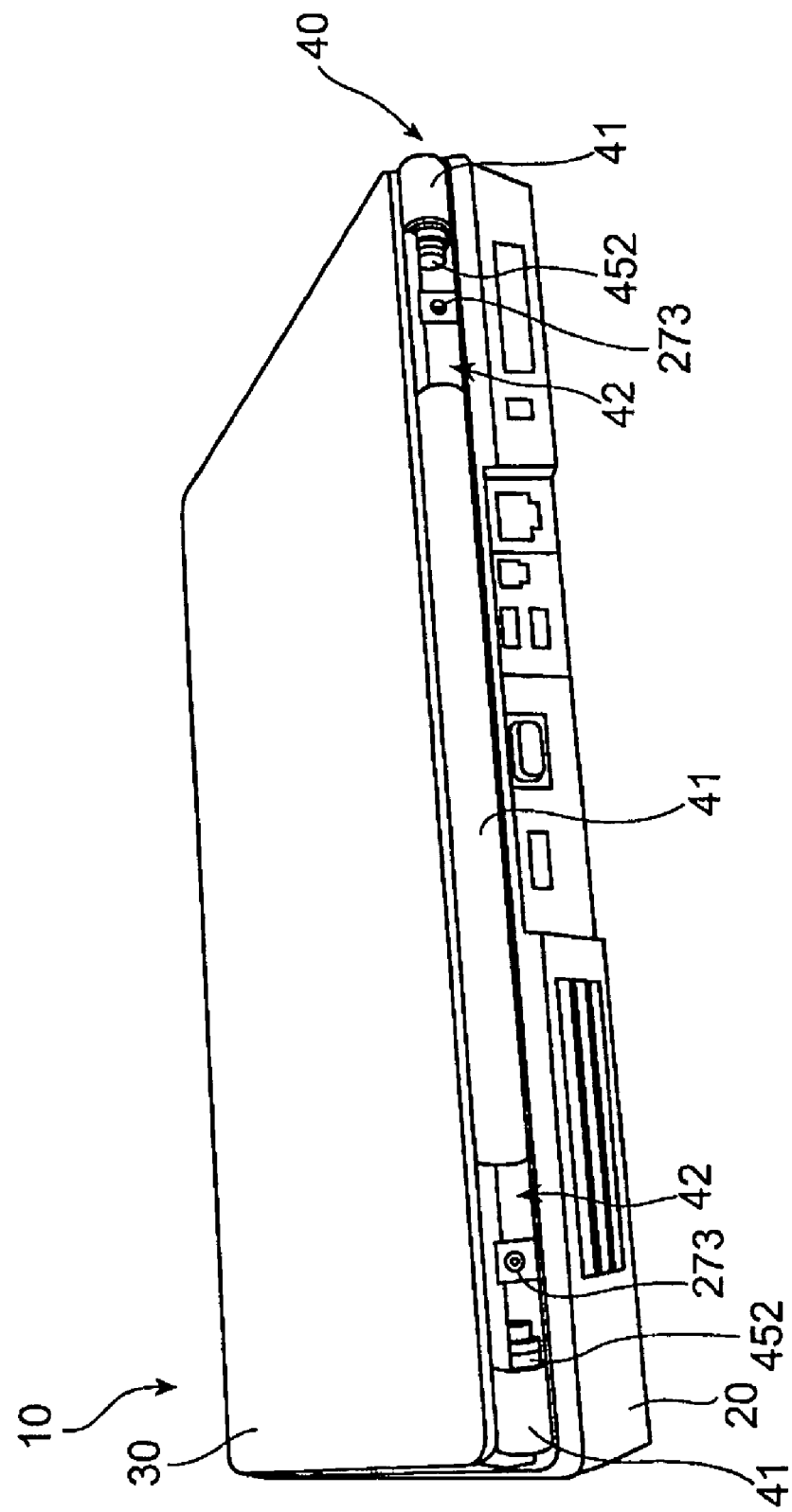
FIG. 9 is a perspective view illustrating a rear side of the notebook computer by removing cover members.

FIG. 9 is a perspective view illustrating a rear side of a notebook computer with the cover member being removed.

Referring to FIG. 9, inside of the portion covered by the cover member 43 (see FIG. 8) is revealed, where the notch portion 42 appears. The notch portion 42 is included in a part of the display unit 30 casing and formed by making a cut in the rod section 40 in the left and right portions. In the notch portion 42, there can be seen a part of the movable section 452 of the hinge unit 45 (see FIGS. 11 and 12), and a screw hole 273 to which a screw is fastened to install the cover member 43 (see FIG. 8).

Figure 10:
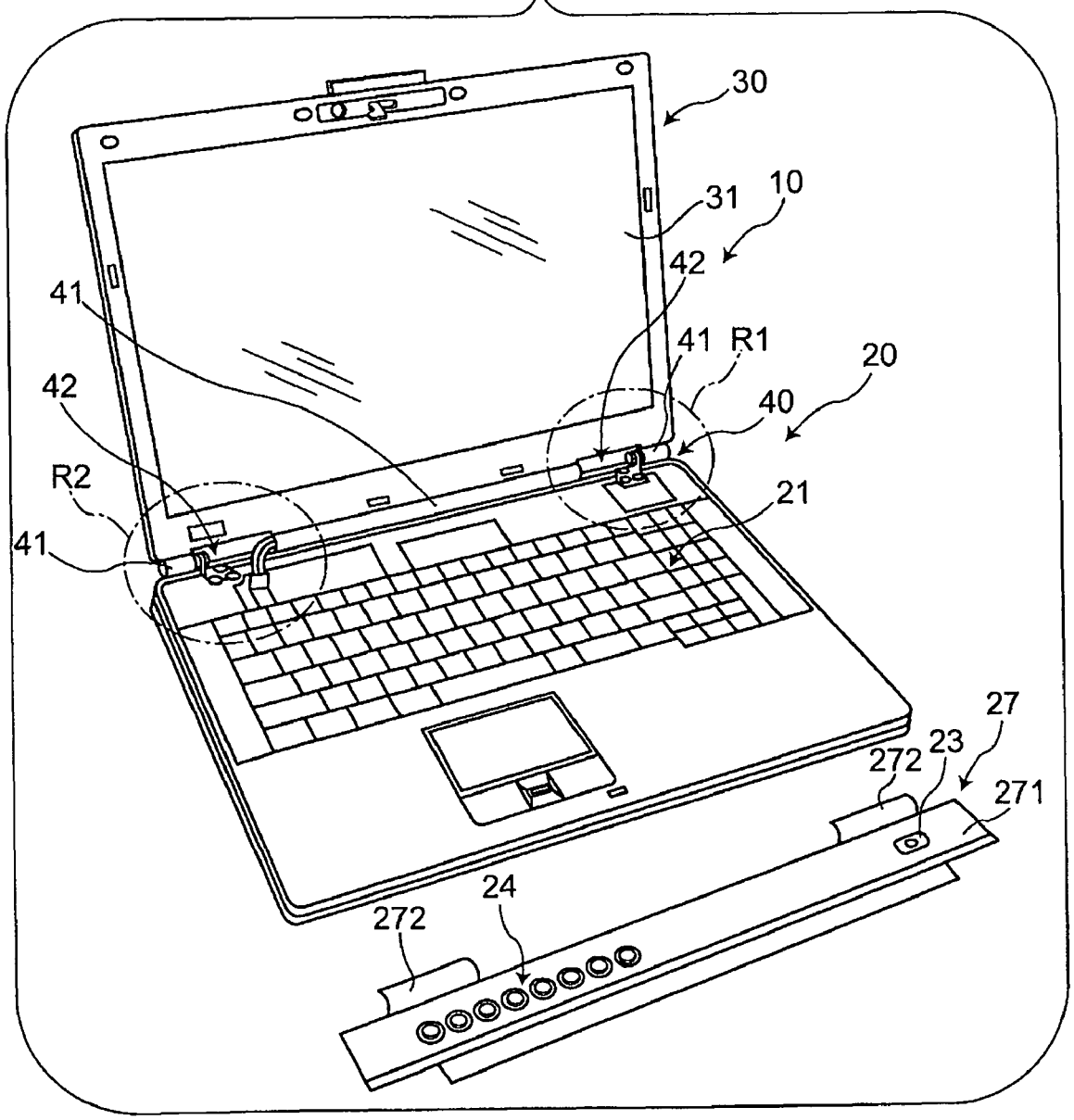
FIG. 10 is a partially exploded perspective view illustrating the notebook computer and a cover member which covers an area of a top surface of the main unit, which area is closer to the hinge section, in a state in which the cover member is removed.

FIG. 10 is a partially exploded perspective view illustrating the notebook computer 10 and a cover member 27 that covers an area closer to the hinge section 40 of a top surface of the main unit, in a state in which the cover member 27 is removed from the notebook computer 10.

The area of the top surface of the main unit 20, which area is closer to the hinge section 40 of the notebook computer, is covered by a cover member 27. This cover member 27 includes a plate portion 271 forming a part of the top surface of the main unit 20 and a pair of rising portions 272 erected in an arc shape from ends of the plating section 271. On the backside (not illustrated) of the plate portion 271, a switch board having switches for detecting pressing of the power button 23 or a variety of function buttons 24 are fixed.

The pair of the rising portions 272 of the cover member 27 have an arc shape fitted to the cylindrical contour of the rod section 41 included in a part of the display unit 30 casing and covers a front side of the notch portion 42 (also, referred to as a first space). A fastener having a screw hole 273 of FIG. 9 is erected on a backside of the rising portion 272.

Figure 11:
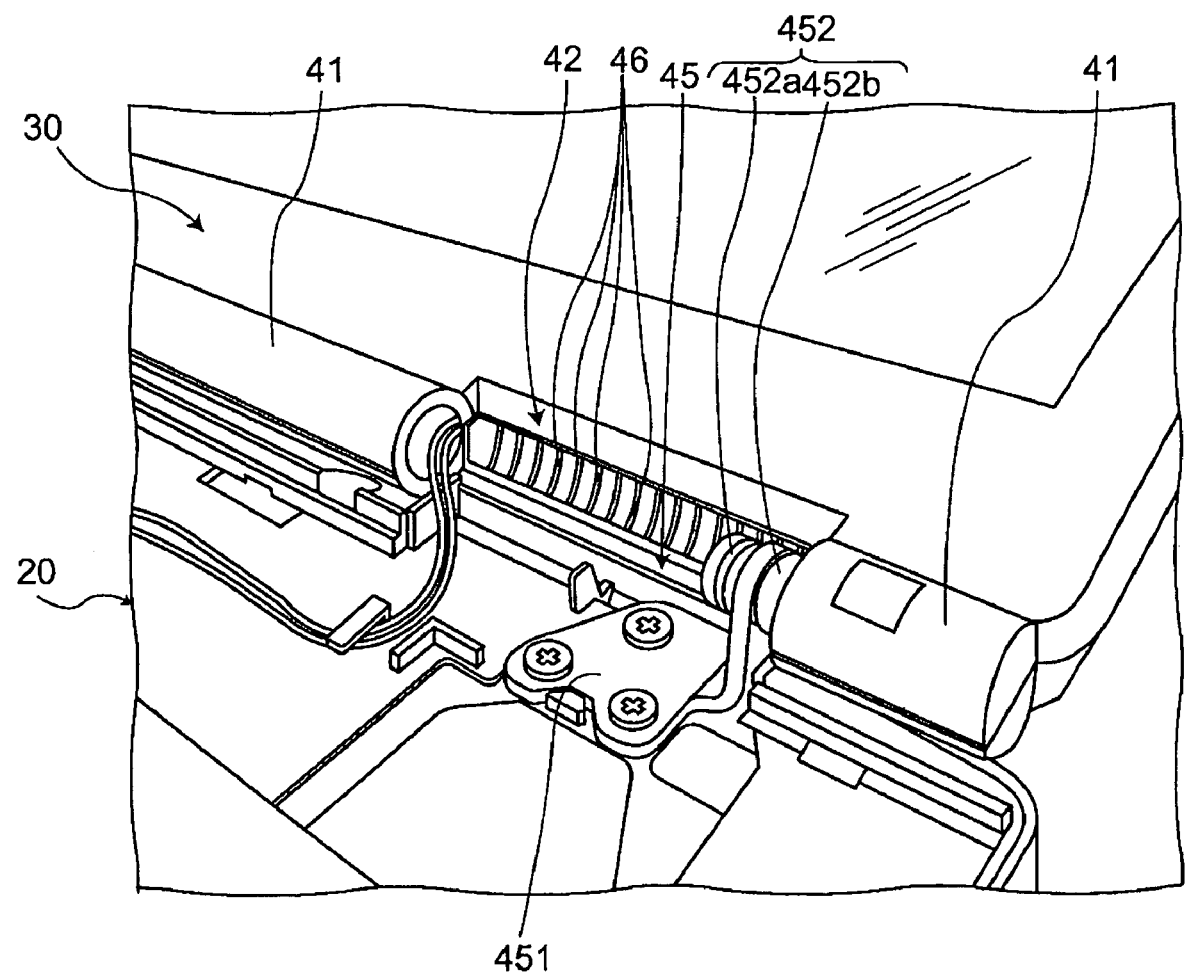
FIG. 11 is a partially enlarged perspective view illustrating components inside a circle R1 of FIG. 10.
Figure 12:
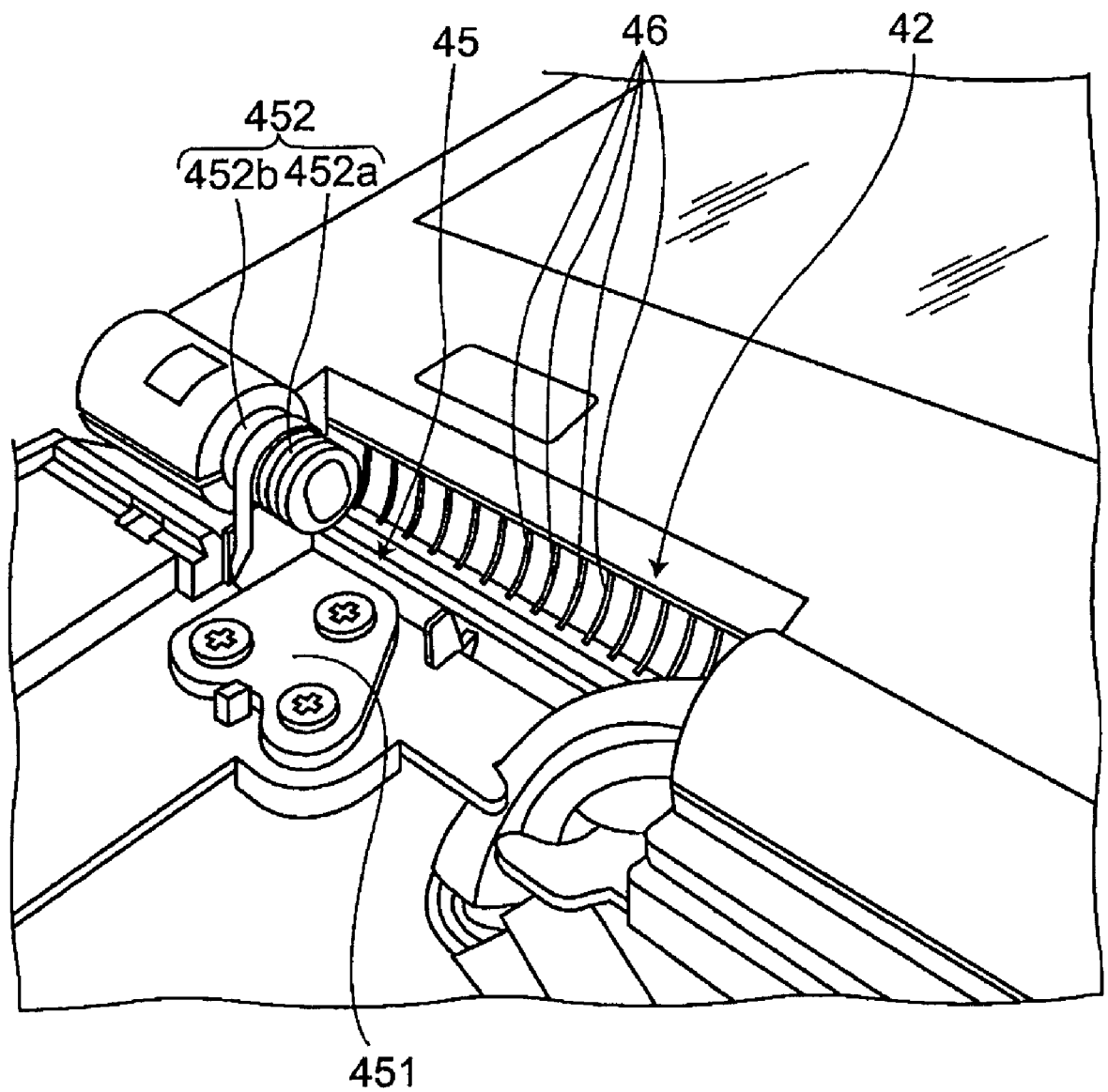
FIG. 12 is a partially enlarged perspective view illustrating components inside a circle R2 of FIG. 10.

FIGS. 11 and 12 are enlarged perspective views illustrating components inside circles R1 and R2 of FIG. 10.

FIG. 11 illustrates a right-side notch portion of FIG. 10, and FIG. 12 illustrates a left-side notch portion of FIG. 10.

The notch portion 42 of FIGS. 11 and 12 includes a hinge member 45 that rotatably supports the display unit 30 against the main unit 20. The hinge member 45 has a fixed section 451 and a movable section 452. The fixed section 451 is fastened to an end of the main unit 20 by screws. The movable section 452 has a shaft 452a fixed to the fixed section 451 and a rotatable section 452b which rotates while causing friction against the axel 452a. Also, the rotatable section 452b is fixed to the display unit 30. Since the hinge members 45 each having such a structure are provided at both sides, the display unit 30 can be opened to a larger extent relative to the main unit 20 than that illustrated in FIG. 1 from the closed position of FIG. 2, and can also be returned to the closed position.

A wall of the display unit 30 casing forming the notch portion 42 has ribs 46 arranged side by side and vertically erected. Each of the ribs 46 has an arc shape fitted to the cylindrical contour of the rod section 41. Effects of the arc shape will be described later.

Figure 13:
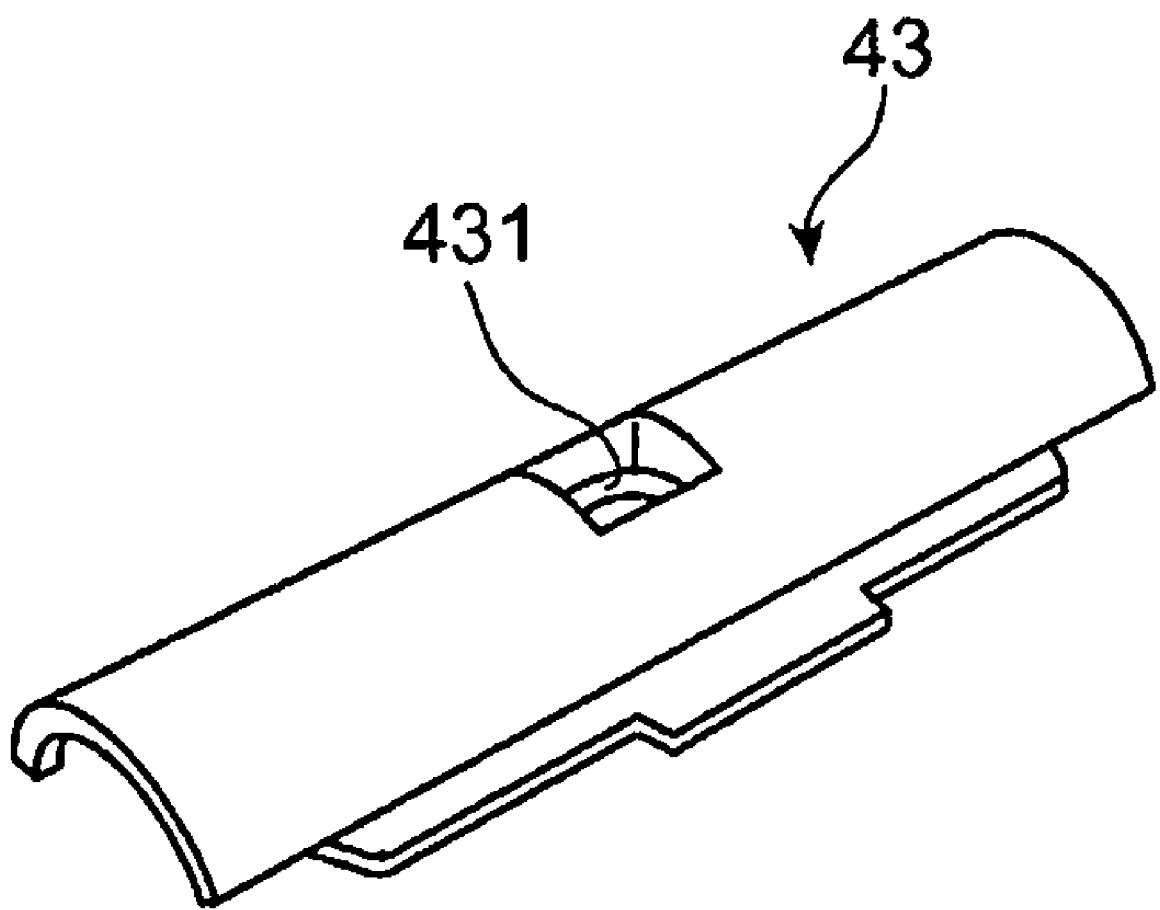
FIG. 13 is a perspective view illustrating the cover member which covers a rear side of a notch portion of FIG. 8.

FIG. 13 is a perspective view illustrating a cover member which covers a rear side of a notch portion of FIG. 8.

The cover member 43 has an arc shape fitted to the cylindrical contour of the rod section 41 (see FIGS. 8 to 12). As illustrated in FIG. 8, the cover member 43 covers the rear side corresponding to a second space of the notch portion 42. The left and right cover members 43 have the same shape for the left and right notch portions 42. The cover member 43 has a central attachment hole 431. The attachment hole 431 is communicated by a screw to the screw hole 273 (see FIG. 9) formed in a rear side of the rising portion 272 of another cover member 27 of FIG. 10. The head of the screw is covered by a patch 43a (see FIG. 8). As a result, the cover member 43 and the rising portion 272 of the counterpart cover member 27 of FIG. 10 are combined with each other to form a cylindrical contour directly extended from the rod section 41. Depending on the rod section 41, the hinge section 40 has harmonious design by having the shape of a single cylinder extending from the left end to the right end of the notebook computer.

Figure 14:
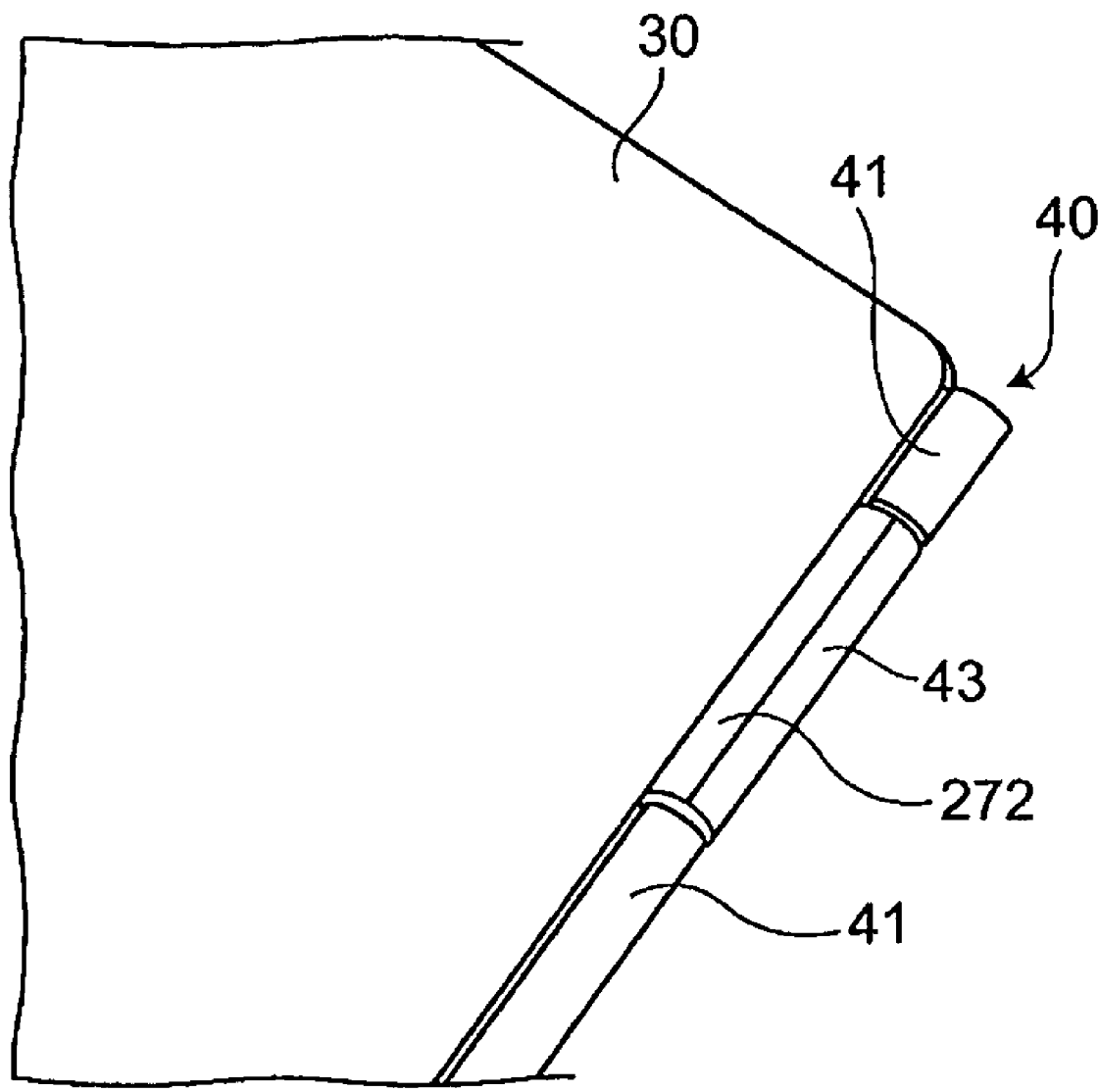
FIG. 14 is a top plan view illustrating a part of a hinge section of the notebook computer in the closed position.

FIG. 14 is a top plan view illustrating a part of the hinge section of the notebook computer in the closed position.

The notch portion 42 is covered by the cover member 43 of FIGS. 8 and 13 and the rising portion 272 of the counterpart cover member 27 of FIG. 10 (see FIGS. 9 to 12), so as to harmoniously form a cylindrical shape in combination with the cylindrical rod section 41. In this case, as illustrated in FIGS. 11 and 12, the ribs 46 are arranged side by side in the notch portion 42 and each have an arc shape fitted to the cylindrical contour of the rod section 41. Therefore, even when the display unit 30 is closed on top of the main unit 20, a part of the display unit 30 casing is overlapped with a part of the rising portion 272 on a top plan view, so that it can also provide harmonious design with no gap. In this regard, the comparative example described below will facilitate understanding of this advantage.

Figure 15:
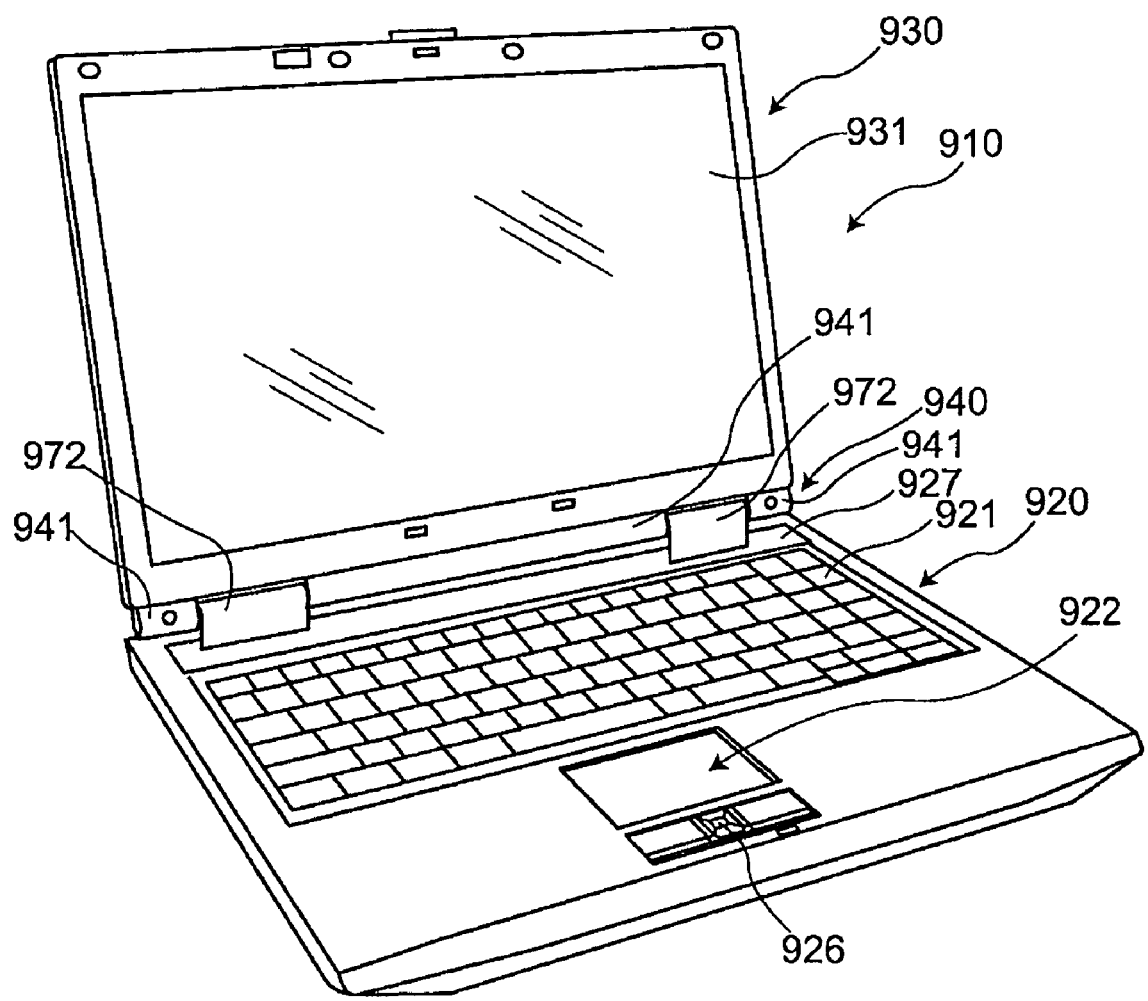
FIG. 15 is a perspective view illustrating appearance of a notebook computer in an open position according to a comparative example.

FIG. 15 is a perspective view illustrating appearance of a notebook computer in an open position according to a comparative example.

This notebook computer 910 includes a main unit 920 and a display unit 930. The display unit 930 can be rotated around the hinge section 940 to be freely opened and closed relative to the main unit 920.

The main unit 920 includes, on its top surface, a keyboard set 921, a pointing device 922 that has been already described with reference to FIG. 7, a fingerprint sensor 926, and a cover member 927 which covers a portion corresponding to the hinge section 90 of the main unit 920.

The display unit 930 has a display screen 931 and a hinge cover section 941 which is disposed in its lower end and included in a hinge section 940 as a part of the display unit 930 casing. The hinge cover section corresponds to the rod section 41 (see FIGS. 8 to 12) of the notebook computer 10 according to the present embodiment of the invention. While the rod section 41 has a cylindrical shape, only the lower end of the hinge cover section 941 has an arc shape.

Figure 16:
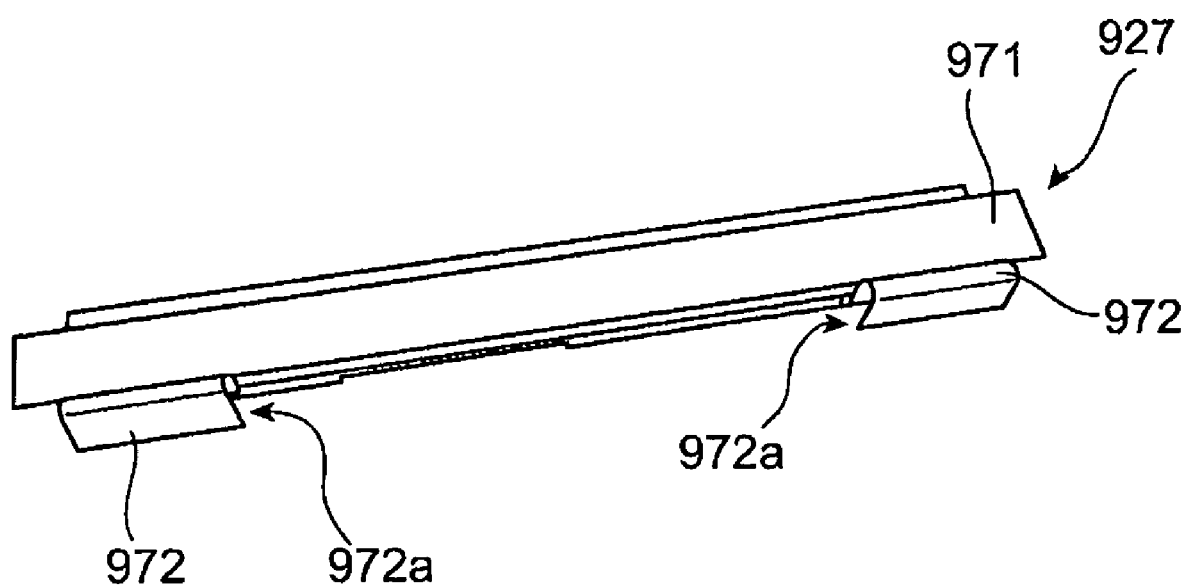
FIG. 16 is a perspective view illustrating a cover member of a notebook computer according to a comparative example.

FIG. 16 is a perspective view illustrating a cover member of the notebook computer according to the comparative example.

While the cover member 927 corresponds to the cover member 27 (see FIG. 10) of the notebook computer according to the present embodiment of the invention, only the upper end of the rising portion 972 has a reversed-U arc shape because the cover member 927 is a resin-molded item, and the size of a groove 972a may be limited due to difficulties in a molding process or an assembling process.

Figure 17:
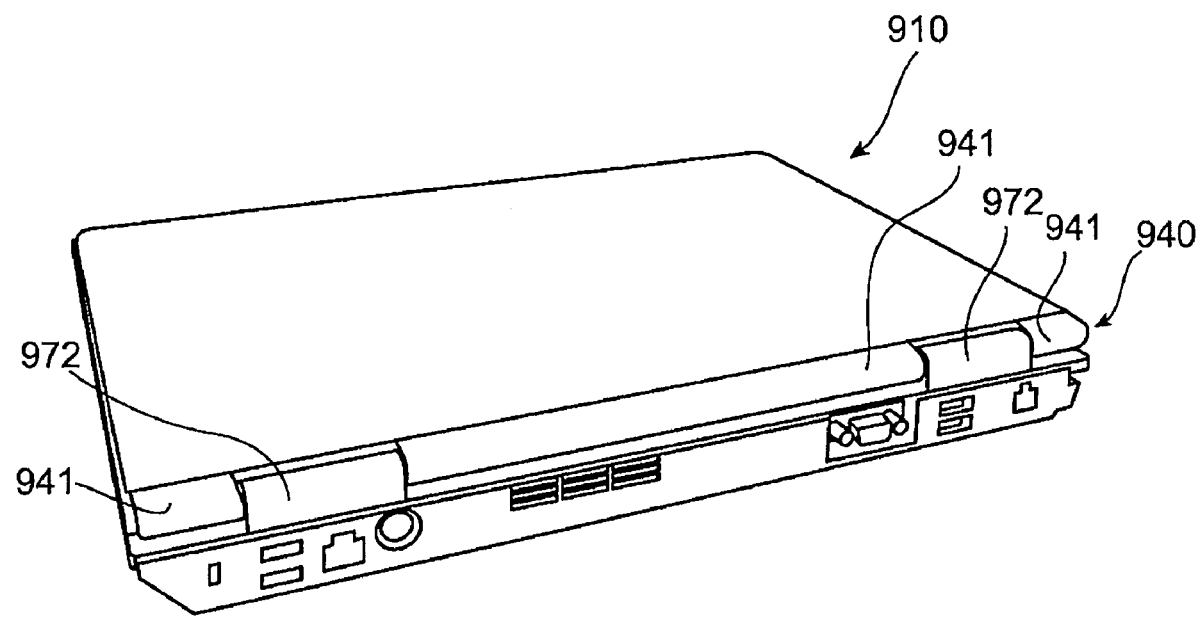
FIG. 17 is a perspective view illustrating a rear side of a notebook computer in a closed position according to the comparative example.
Figure 18:
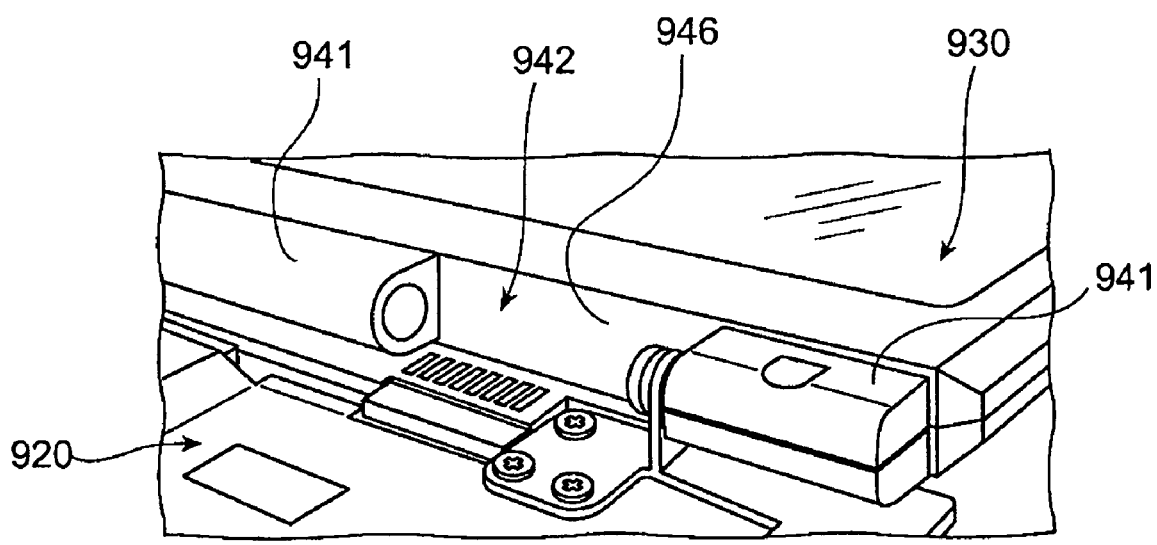
FIG. 18 is an enlarged view illustrating a notch portion formed by making a cut in a hinge cover section.

FIG. 17 is a perspective view illustrating a rear side of the notebook computer 910 in a closed position according to the comparative example. FIG. 18 is an enlarged view illustrating a notch portion 942 formed by making a cut in the hinge cover section 941.

As illustrated in FIG. 18, an arc-shaped portion of the hinge cover section 941 of the notebook computer 910 is horizontally protruded, and an arc-shaped portion of the cover member 927 (see FIGS. 15 to 17) is vertically protruded. In addition, a wall 946 defining a part of the notch portion 942 of the display unit 930 is made flat in order to avoid interference with the rising portion 972 of the cover member 927.

Figure 19:
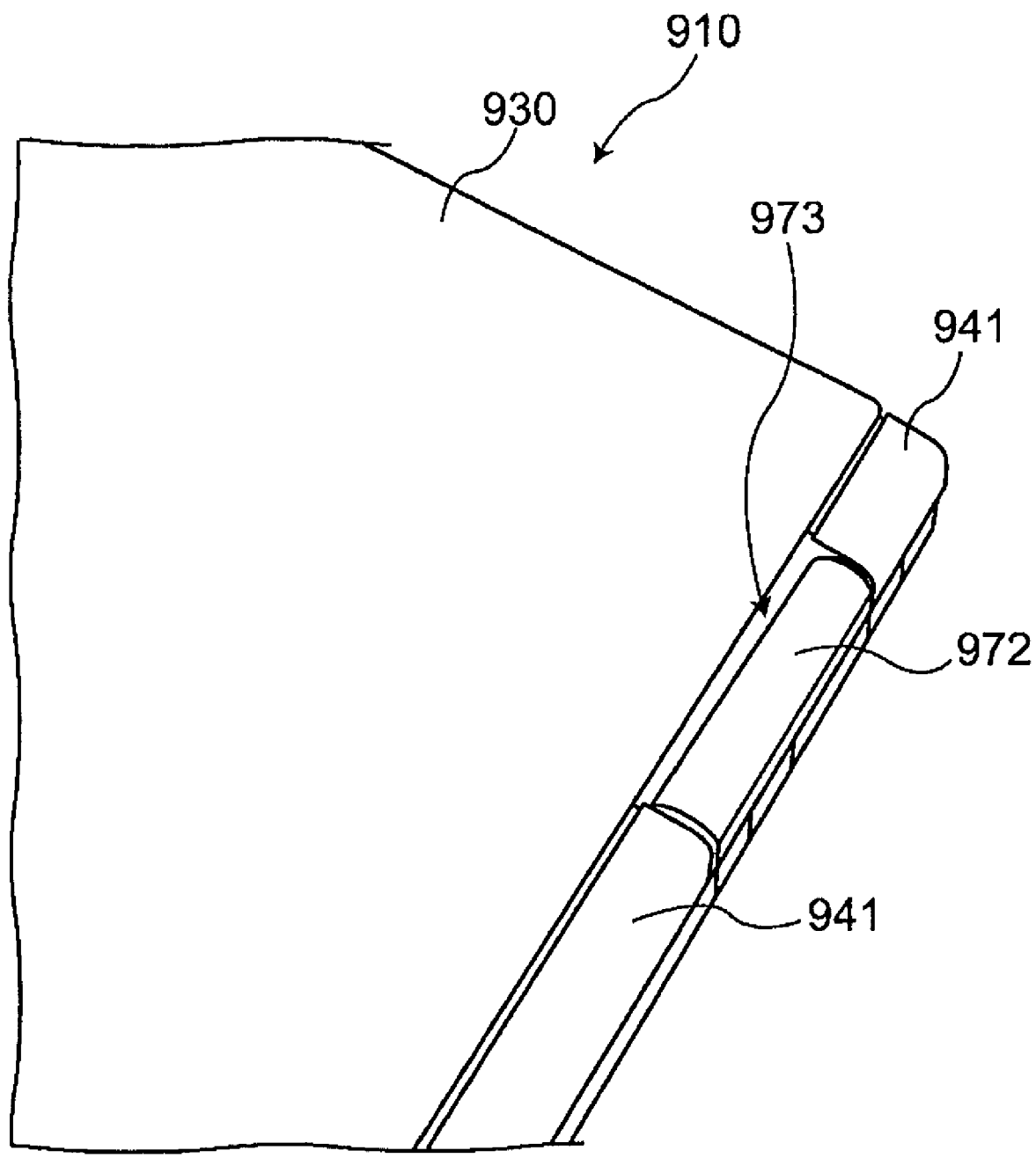
FIG. 19 is a top plan view illustrating a part of the hinge section of the notebook computer in the closed position according to the comparative example.

FIG. 19 is a top plan view illustrating a part of the hinge section of the notebook computer in the closed position according to the comparative example, which corresponds to FIG. 14 according to the present embodiment of the present invention.

The notebook computer 910 according to the comparative example structurally has a slit 973 between the display unit 930 casing (specifically, the wall 946 illustrated in FIG. 18) and the rising portion 972. This fact also makes it difficult to provide harmonious design for the hinge section 940.

(Connector Fixing Structure)

Figure 20:
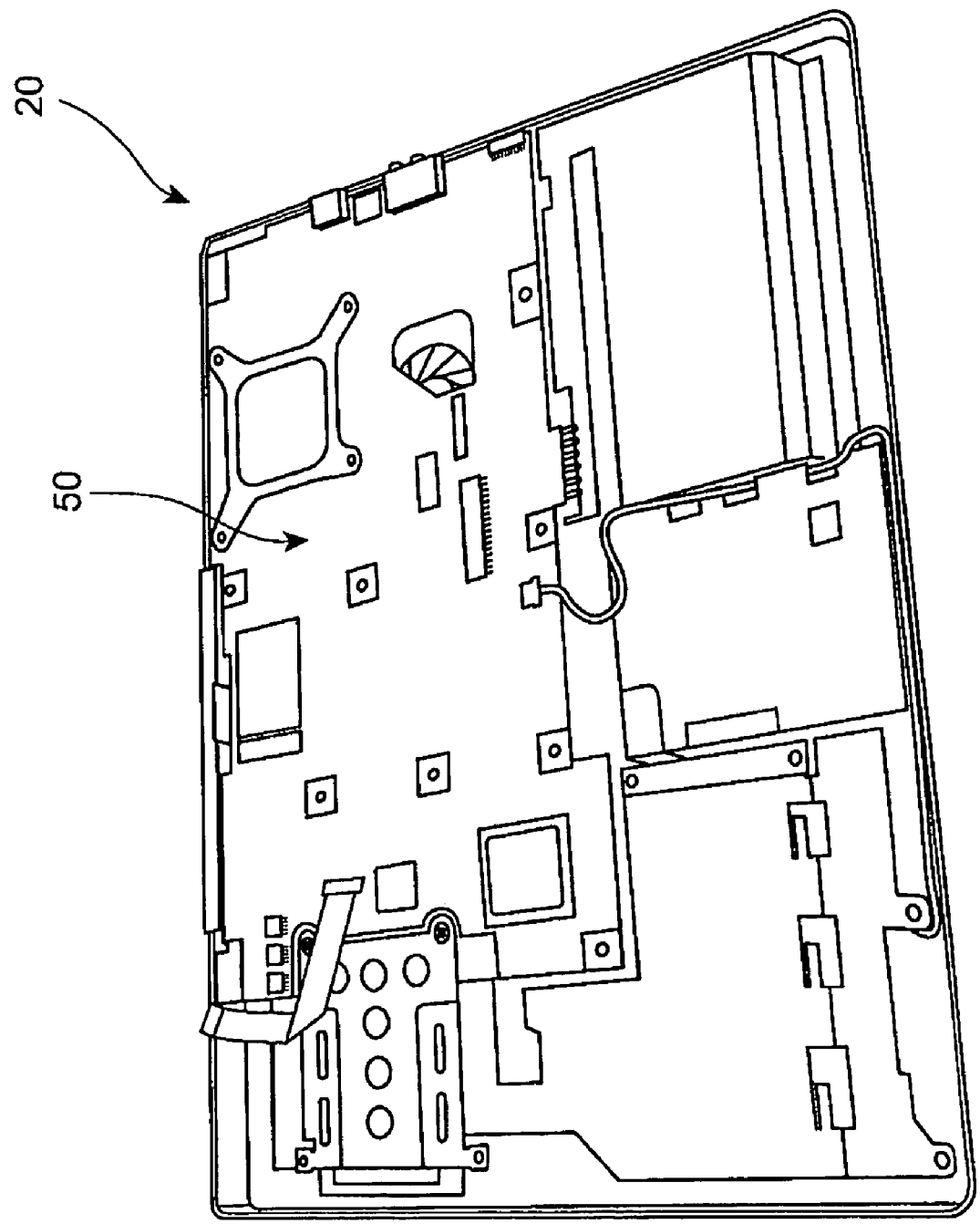
FIG. 20 is a perspective view illustrating a backside of the notebook computer of FIG. 1 and FIG. 2 according to the embodiment of the present invention with a bottom cover being removed.

FIG. 20 is a perspective view illustrating a backside of the main unit of the notebook computer illustrated in FIG. 1 and FIG. 2 according to the embodiment of the present invention, from which a bottom cover is removed.

It can be seen that there are a number of components such as a circuit board unit 50. Now, the circuit board unit 50 will be described more in detail.

Figure 21:
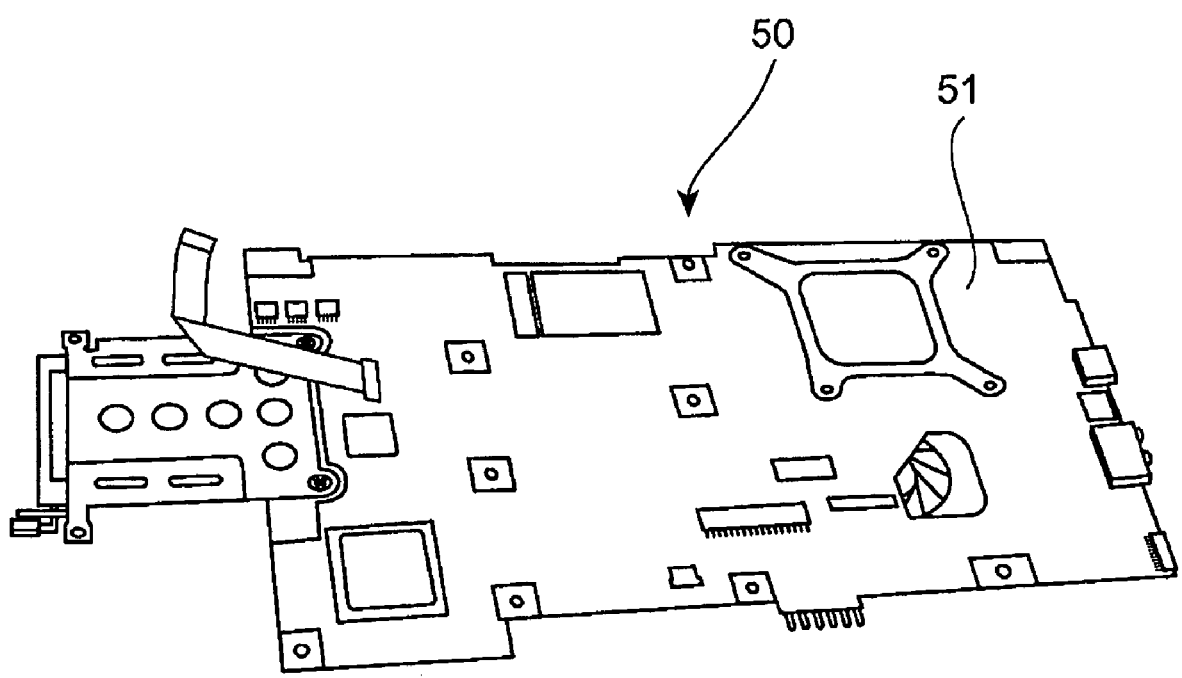
FIG. 21 is a perspective view illustrating a circuit board unit removed from the main unit of FIG. 20.
Figure 22:
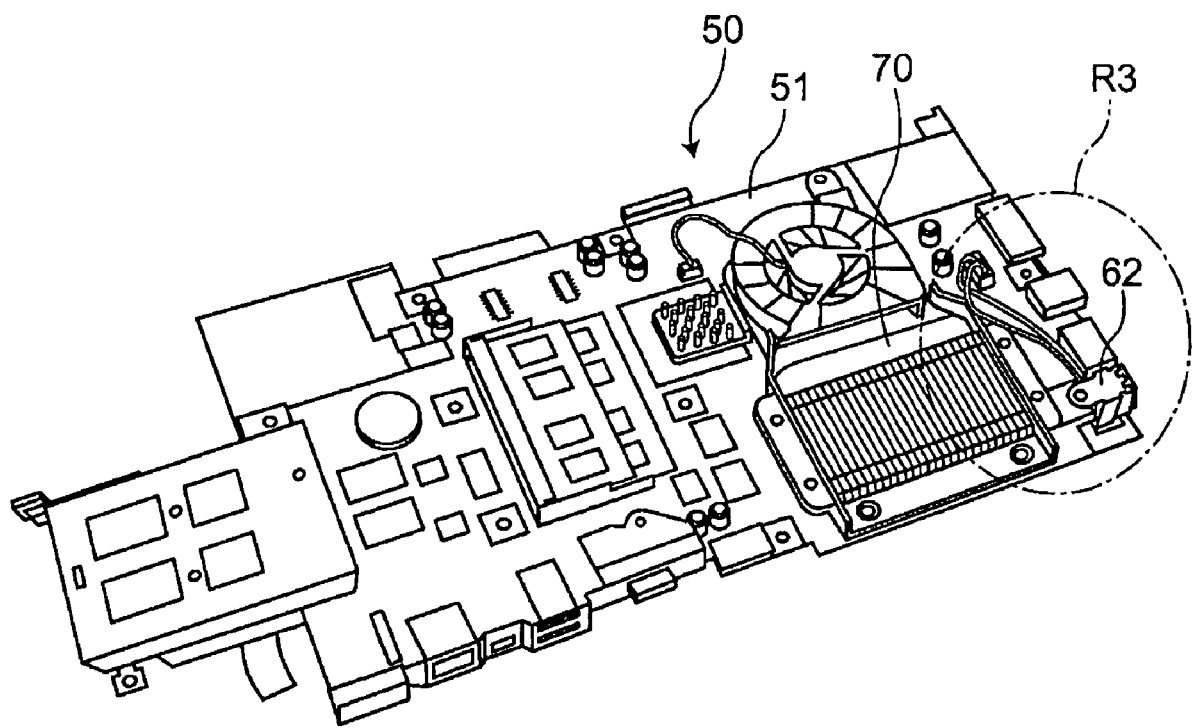
FIG. 22 is a perspective view illustrating a backside of the circuit board unit of FIG. 21.

FIG. 21 is a perspective view illustrating the circuit board unit 50 being removed from the main unit 20 of FIG. 20. FIG. 22 is a perspective view illustrating a back side of the circuit board unit 50 of FIG. 21.

A variety of components are mounted on a circuit board 51 in the circuit board unit 50. First of all, the structure of a heat sink unit 70 and an attachment structure for the power connector 25 of FIG. 1 will be described.

Figure 23:
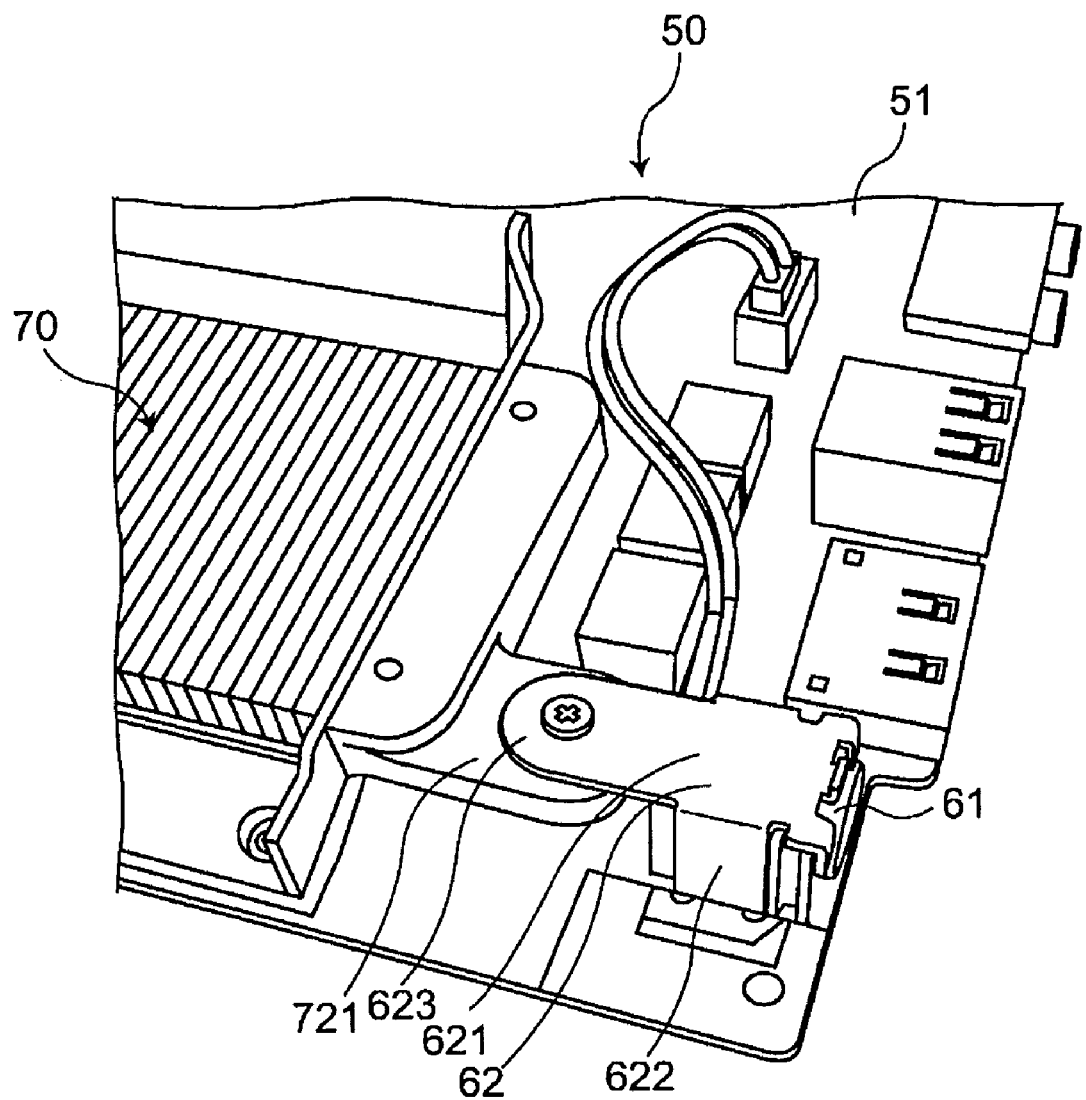
FIG. 23 is a partially enlarged perspective view illustrating components inside a circle R3 of FIG. 22.
Figure 24:
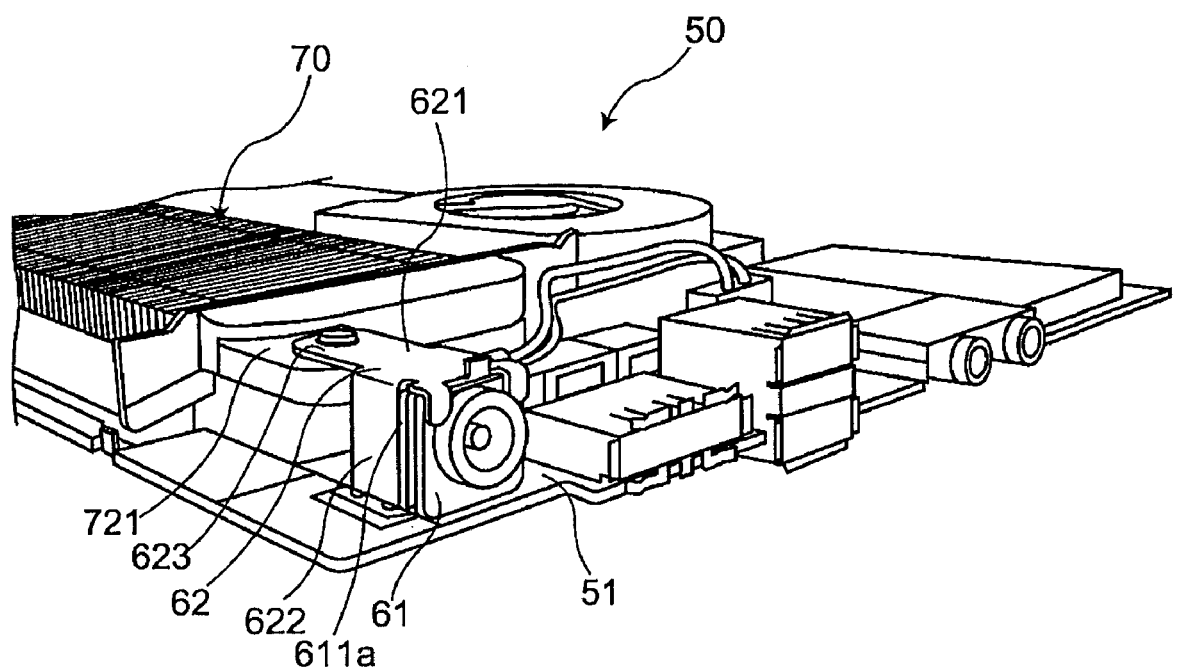
FIG. 24 is a partially enlarged perspective view illustrating components inside the circle R3 of FIG. 22 as viewed from an angle different from that of FIG. 23.

FIG. 23 is a partially enlarged perspective view illustrating components inside a circle R3 of FIG. 22. FIG. 24 is a partially enlarged perspective view illustrating the same part as viewed from an angle different from that of FIG. 23.

Referring to FIGS. 23 and 24, there are illustrated a power connector 61 mounted on the circuit board 51, a support member 62 which supports the power connector 61 on the circuit board 51, and the heat sink unit 70 mounted on the circuit board 51.

Figure 25:
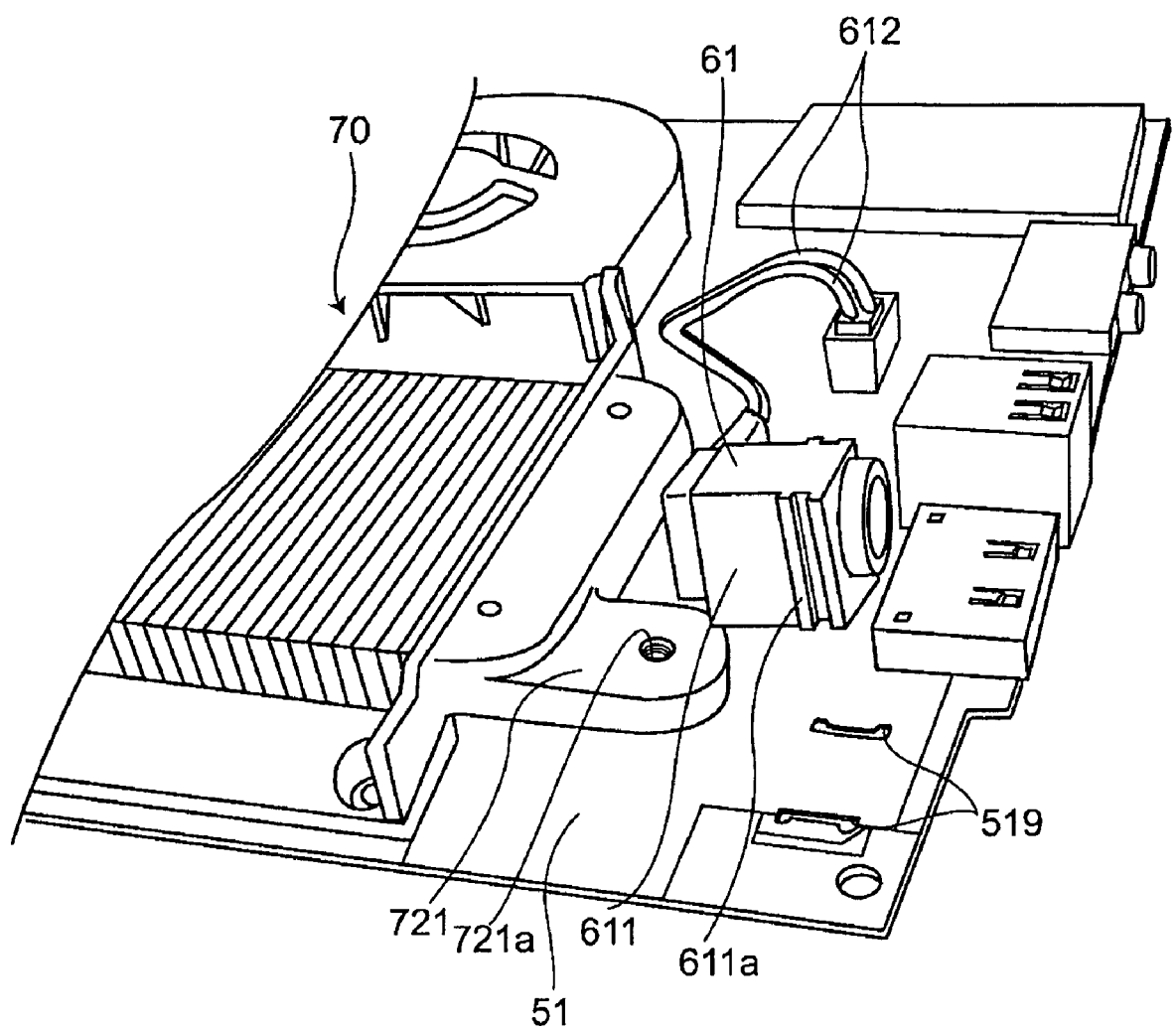
FIG. 25 is a partially enlarged perspective view illustrating components inside the circle R3 of FIG. 22 with the power connector being disconnected by removing the support member.

FIG. 25 is a partially enlarged perspective view illustrating components inside the circle R3 of FIG. 22 with the power connector 61 being disconnected by removing the support member.

The power connector 61 is not fixed to the circuit board 51 by soldering or the like. Rather, the power connector 61 is simply loaded on the circuit board 51 and electrically connected to the circuit board 51 via cables 612.

In this case, a pair of openings 519 are formed on the circuit board 51 by a drilling process. The openings 519 are spaced to receive the power connector 61. Each opening 519 extends along each side surface of the power connector 61 and is right-angled at both ends. The reason why the opening 519 is right-angled at both ends is as follows. When each of side plates 622 of the support member 62 is inserted into the corresponding opening 519, surrounding plane surfaces of an end portion of the side plate 622 need to adjoin walls that define the opening 519. However, both ends of the opening 519 would be in the shape of an arc by a drilling process if no effort is made. Therefore, the opening 519 is right-angled at both ends.

Figure 26:
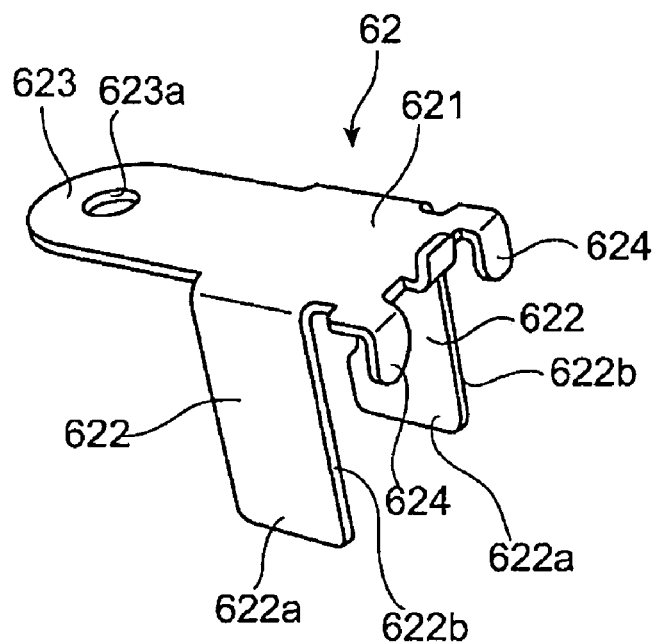
FIG. 26 is a perspective view illustrating a supporting member.

FIG. 26 is a perspective view illustrating the supporting member 62.

The support member 62 includes: an upper plate 621 to adjoin the power connector 61; the two side plates 622 that are bent to extend from the upper plate 621 to be spread along a pair of side faces 611 (see FIG. 25) of the power connector 61; and a fixed section 623 which extends from the upper plate 621 to be fixed to the heat sink unit 70. The pair of side plates 622 are respectively inserted into the pair of openings 519 (see FIG. 25) formed on the circuit board 51 to support the power connector 61. In addition, the fixed section 623 has an attachment hole 623a used to secure the fixed section 623 to the heat sink unit 20 via screw. The heat sink unit 70 has an engagement section 721 having a screw hole 721a (see FIG. 25). The support member 62 is fixed to the heat sink unit 70 by a screw inserted into the screw hole 721a of the heat sink unit 70 and the attachment hole 623a of the fixed section 623.

Further, the support member 62 includes a pair of engagement claws 624 extending from the upper plate 621. The engagement claws 624 hold a mating surface of the power connector 61 facing a counterpart connector to prevent the power connector 61 from being moved in a demating direction toward the counterpart connector.

Further, an engagement protrusion 611*a* is formed to vertically extend on each of the sides 611 of the power connector 61 (see FIG. 25). The engagement protrusion 611*a* adjoins a front end face 622*b* of the side plates 622 of the support member 62 so as to prevent the power connector 61 from being moved in an insertion direction opposite to the demating direction.

Figure 27:
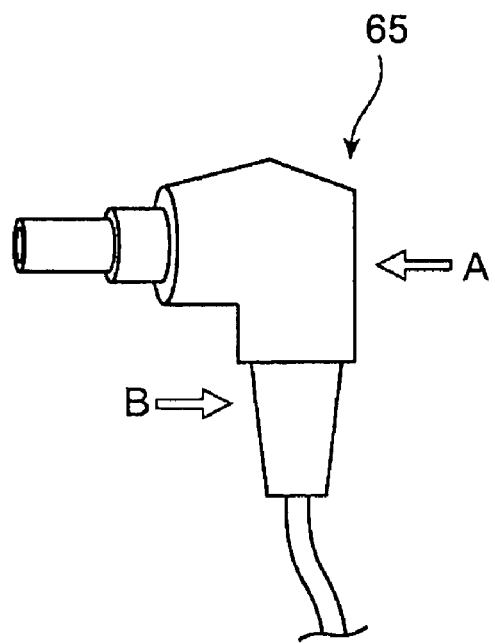
FIG. 27 is a schematic diagram illustrating a counterpart connector to be mated with the power connector on the circuit board.

FIG. 27 is a schematic diagram illustrating the counterpart connector 65 to be mated with the power connector 61 on the circuit board.

The counterpart connector 65 is attached to a leading edge of a cable extended from an AC adaptor (not illustrated) for converting commercially available AC power into DC power appropriate to the operation of the notebook computer. In most cases, if a user stays in a predetermined area, the notebook computer usually operates while receiving electrical power from the AC adaptor, and the counterpart connector 65 of FIG. 27 is left inserted into the power connector 61 for a long time. In this case, the counterpart connector 65 may be frequently pushed in a direction indicated with an arrow A or pulled in a direction indicated with an arrow direction B as illustrated in FIG. 27. If the counterpart connector 65 is impacted in an arrow direction A, the power connector 61 maybe impacted in an insertion direction. Otherwise, the counterpart connector 65 is attracted in an arrow directions, the power connector 61 may experience a torsion force. If the power connector 61 is directly soldered to the circuit board 51 in a way similar to a conventional notebook computer, the bonded solder may be exfoliated, and errors in the operation may occur. According to the present embodiment of the invention, since the power connector 61 is simply loaded on the circuit board 51 and connected to the circuit board 51 via a cable 612, any impact or stress applied to the power connector 61 is distributed to the support member 62 or the heat sink unit 70. As a result, it is possible to avoid errors in operation caused by any undesired impact or stress.

(Structure of Heat Sink Unit)

Figure 28:
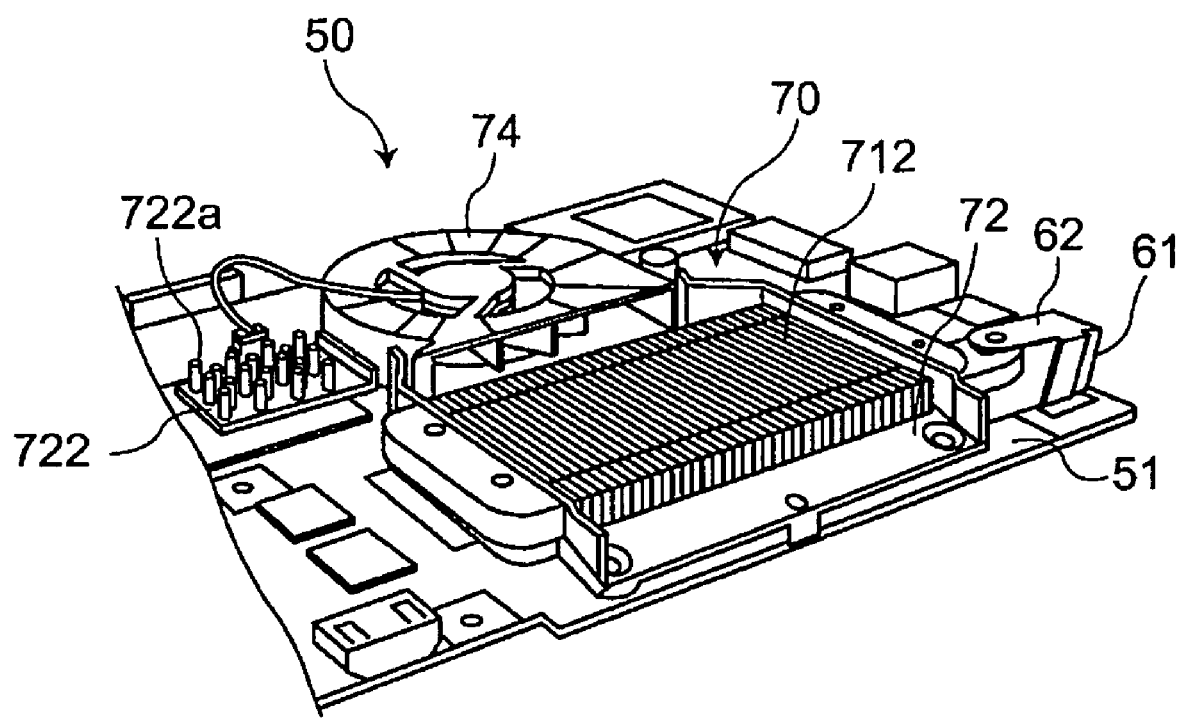
FIG. 28 is a perspective view illustrating a heat sink unit on the circuit board by removing fixing screws used for fixing to the circuit board and the support member.
Figure 29:
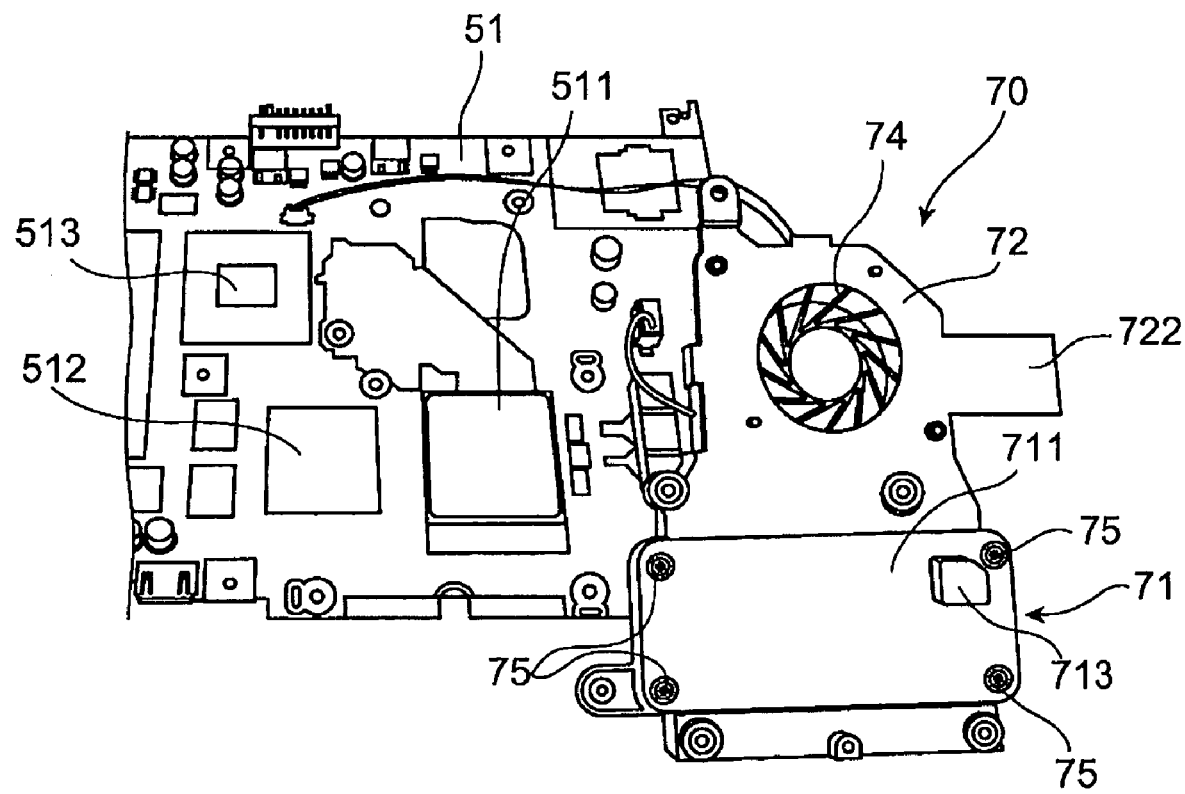
FIG. 29 is a perspective view illustrating a backside, which faces the circuit board, of the heat sink unit removed from the circuit board.
Figure 30:
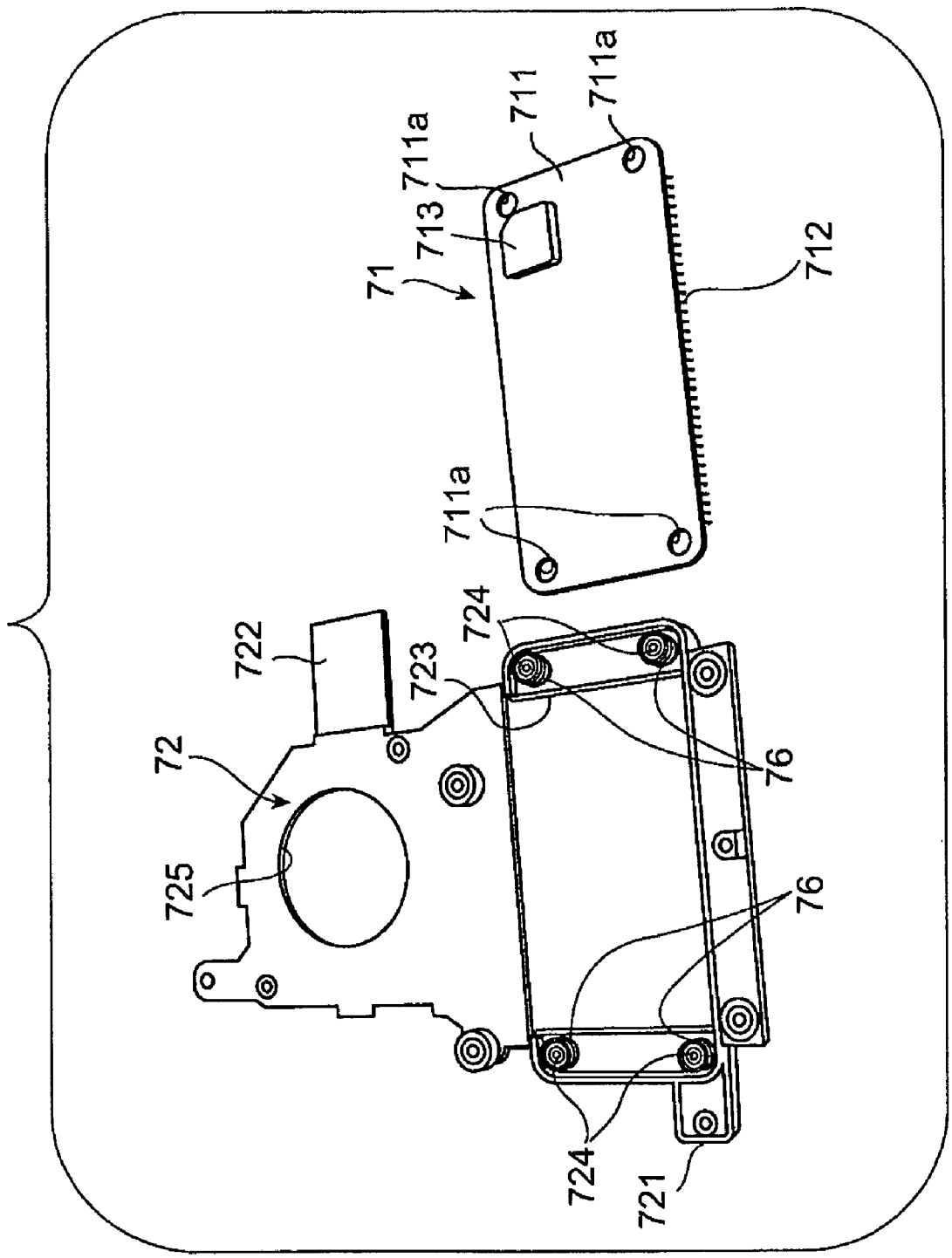
FIG. 30 is an exploded perspective view illustrating the heat sink unit by removing a cooling fan and separating a cooling member from an attachment member.
Figure 31:
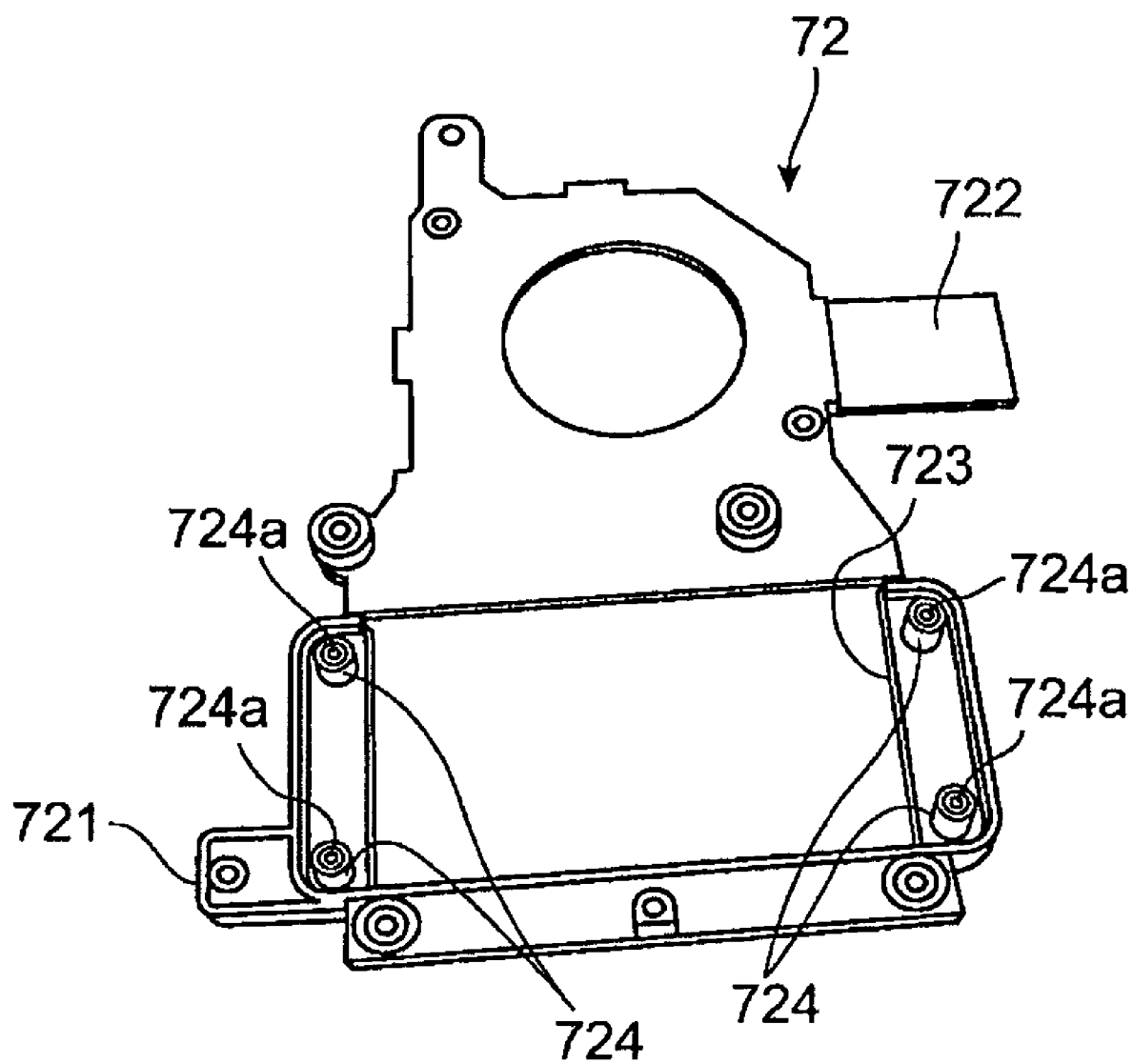
FIG. 31 is a perspective view illustrating the attachment member by removing a coil spring.

FIG. 28 is a perspective view illustrating the heat sink unit on the circuit board by removing fixing screws used for fixing to the circuit board and the support member. FIG. 29 is a perspective view illustrating a backside, which faces the circuit board, of the heat sink unit removed from the circuit board. FIG. 30 is an exploded perspective view illustrating the heat sink unit by removing a cooling fan and separating a cooling member from an attachment member. FIG. 31 is a perspective view illustrating the attachment member by removing a coil spring.

The heat sink unit 70 includes a cooling member 71, an attachment member 72, a coil spring 76, and a cooling fan 74.

The cooling member 71 includes a metal plate 711 of FIG. 30 and a number of cooling fins 712 erected from the metal plate 711.

Four attachment holes 711*a* are formed at the corners of the metal plate 711, and the cooling fins 712 are erected in a central area avoiding the attachment holes 711*a*. FIG. 30 illustrates a bottom surface (also, referred to as a first surface) of the metal plate 711 which serves as a support for the cooling fins 712 as well as adjoins heat-generating electronic components disposed on the bottom surface to absorb the heat and transmit it to the cooling fins 712. The cooling fins 712 are erected from the top surface (also, referred to as a second surface).

Mounted on the circuit board 51 of FIG. 29 are; a central processing unit (CPU) 511 that is one of the heat-generating electronic components; and two additional heat-generating components 512 and 513.

A metallic member 713 is soldered to the bottom surface of the metal plate 711 of the cooling member 71. Since the CPU 511 and the heat-generating electronic component 512 have different heights on the circuit board 51, the height and location of the metallic member 713 is adjusted to allow the bottom surface of the metal plate 711 to adjoin the CPU 511 and allow the metallic member 713 to adjoin the heat-generating electronic component 512. The metallic member 713 forms a protrusion projecting from a reference face of the bottom surface of the metal plate 711.

The design of the metallic member 713 soldered to the bottom surface of the metal plate 711 to adjoin two heat-generating electronic components makes the heat sink unit to be widely used for general purpose by adjusting the thickness of the metallic member 713 or adjusting the soldering location even when the heat-generating electronic components have different heights or locations. That is, this structure allows the heat sink unit 70 to be compatible with a number of different types of circuit boards.

In addition, heat generated from another heat-generating electronic component 513 is absorbed by the attachment member 72. The attachment member 72 includes a heat absorption section 722 adjoining the heat-generating electronic component 513, and the bottom surface of the heat absorption section 722 adjoins the heat-generating electronic component 513. Formed on the opposite surface to the bottom surface adjoining the heat-generating electronic component 513 of the heat absorption section 722 are a number of heat sink protrusions 722*a* (see FIG. 28) for emanating the heat absorbed from the heat-generating electronic component 513 to the air. Among the three heat-generating electronic components 511 to 513 and CPU 511 mounted on the circuit board 51, the heat generation amount of the CPU 511 is the largest, and the heat generation amount of the heat-generating electronic component 512 is larger than that of the heat-generating electronic component 513. The heat sink unit 70 absorbs the heat based on the heat generation amounts of the heat generating electronic components 511 to 513.

The fan 74 of the heat sink unit 70 sends air to the cooling fins 712, and the air heated through the cooling fins 712 is externally discharged from the main unit casing 20 through the air outlet 27 (see FIG. 8).

As illustrated in FIG. 29, the metal plate 711 of the cooling member 71 is attached to the attachment member 72 by four screws 75. FIG. 30 illustrates the cooling member 71 and the attachment member 72 arranged side by side, by removing the fan 74 from the attachment member 72 and further removing the four screws 75 used to attach the cooling member 71. The attachment member 72 has an opening 723 at which the cooling fins 712 of the cooling member 71 are disposed, and four fasteners 724 protruding from the bottom and inserted into the attachment holes 711*a* of the cooling member 71 around the opening 723. Each of the four fasteners 724 has a screw hole 724*a* (see FIG. 31) to attach the cooling member 71 by fastening the screw 75 (see FIG. 29). Also, the attachment member 72 has an air inlet 725 to supply air to the fan 74 (see FIGS. 28 and 29). Each of the four fasteners 724 is surrounded by a coil spring 76 and inserted into the attachment hole 711*a* of the cooling member 71. In this state, the four screws 75 are fastened as illustrated in FIG. 29. As a result, when the heat sink unit 70 is mounted on the circuit board 51, the cooling member 71 is pressed toward the circuit board 51 by means of the four coil springs 76 interposed between the attachment member 72 and the metal plate 711 of the cooling member 71, so that the heat sink unit 70 can be sufficiently abutted against the CPU 511 or the heat-generating electronic component 512.

According to the present embodiment of the invention, using the heat sink unit 70 having such a simple structure, it is possible to efficiently cool heat-generating electronic components such as CPU 511 on the circuit board 51.

While all the fasteners 724 are surrounded by the coil springs 76 in the present embodiment, the invention is not intended to be limited thereto. For example, the coil spring 76 may be selectively combined with any number of the fasteners 724 depending on the location of the heat source such as the CPU 511 relative to the cooling member 71. The bottom surface of the metal plate 711 is rectangular, and the attachment holes 711a are formed at the four corners of the rectangle. For example, when a heat source is located near one side of the metal plate 711, the coil spring 76 may be provided for each of the screws 75 respectively inserted into two of the attachment holes 711a near that side. By way of another example, when a heat source is located near a corner of the metal plate 711, the coil spring 76 may be provided for each of the screws 75 inserted into three of the attachment holes 711a near that corner of the four attachment holes 711a. Even in these structure, the metal plate 711 can be sufficiently abutted against the heat source by spring force while balance is retained. These structures may be helpful to reduce cost, since the number of the coil springs 76 can be minimized with respect to the four screws 75.

In the present embodiment, the fasteners 724 having the same lengths based on the reference face of the attachment member 72 and the coil springs 76 of the same type are used. However, the present invention is not limited thereto. For example, depending on the location of a heat source relative to the metal plate 711, the length of the fastener may be shortened by partially raising a portion of the metal plate corresponding to the fastener 724. For example, when a heat source is located near one side of the metal plate 711, the fasteners 724 near that side may be shortened by partially raising a portion of the metal plate 711 corresponding to two corners near that side. This structure may allow the metal plate 711 to be abutted against the heat source by balancing elasticity using the coil springs 76 of the same type.

Further, in the present embodiment, the screw holes 724a are formed in the fasteners 724 of the attaching member 72, and the screws 75 are inserted into the screw holes 724a to install the cooling member 71. However, the structure of the heat sink unit 70 is not limited to this structure. For example, the circumference of the leading end of the fastener 724 of the attachment member 72 may be threaded, and the cooling member 71 may be installed using a nut or the like.

Furthermore, while the metallic member 713 is soldered to the reference face of the bottom surface of the metal plate 711 in the present embodiment, the present invention is not limited to this example. For example, when the heat sink unit 70 is applied to a circuit board produced based on a specific design, the bottom surface of the metal plate 711 may be raised from the reference face to form a protrusion depending on the location of a heat-generating electronic component of the circuit board.

In the heat-sink unit described above in the embodiment, a coil spring is interposed between the attachment member and the metal plate, and the heat sink unit has a structure for applying elasticity on its own, so that the heat sink unit is readily attached to the circuit board, and errors are seldom generated in an assembling process. Since the structure of the heat sink unit is also simple and easy in comparison with a comparative example which will be described later, it is possible to reduce cost.

In addition, the electronic device described above in the embodiment includes a circuit board unit disclosed in this document and a casing for storing the circuit board unit.

Since the heat sink unit, the circuit board unit, and the electronic device described above in the embodiment have a simple and easy structure for applying elasticity on its own, it is possible to reduce cost and errors in an assembling process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A heat sink unit comprising:
   a cooling member including a metal plate having a plurality of attachment holes on edges thereof, a first surface of the metal plate adjoining a heat-producing electronic component, and a second surface of the metal plate having a plurality of cooling fins erected on an area other than the attachment holes;
   an attachment member including an opening in which the cooling fins are disposed when the cooling member is installed and a plurality of threaded bosses protruding from the first surface to be inserted into each of the attachment holes; and
   coil springs into which the bosses are respectively inserted, wherein the coil springs are interposed between the attachment member and the metal plate, and the bosses are inserted into the attachment holes to fix the cooling member by screws.

2. The heat sink unit according to claim 1, further comprising a fan fixed to the attachment member to send air to the cooling fins.

3. The heat sink unit according to claim 1, further comprising a protrusion which protrudes from a reference face of the first surface of the metal plate and adjoins a second heat-producing electronic component to transmit heat produced from the second heat-producing electronic component to the metal plate.

4. A circuit board unit comprising:
   a circuit board;
   a heat-producing electronic component which is mounted on the circuit board and produces heat by consuming electric power; and
   a heat sink unit which is fixed to the circuit board and emits the heat produced by the heat-producing electronic component,
   wherein the heat sink unit comprises:
   a cooling member including a metal plate having a plurality of attachment holes on edges thereof, a first surface of the metal plate adjoining a heat-producing electronic component, and a second surface of the metal plate having a plurality of cooling fins erected on an area other than the attachment holes;
   an attachment member including an opening in which the cooling fins are disposed when the cooling member is installed and a plurality of threaded bosses protruding from the first surface to be inserted into each of the attachment holes; and coil springs into which the bosses are respectively inserted, and wherein the coil springs are interposed between the attachment member and the metal plate, and the bosses are inserted into the attachment holes to fix the cooling member by screws.

5. The circuit board unit according to claim 4, wherein the heat sink unit further comprises a fan fixed to the attachment member to send air to the cooling fins.

6. The circuit board unit according to claim 4, further comprising a second heat-producing electronic component which is mounted on the circuit board and has a height lower than the heat-producing electronic component, wherein the heat sink unit further comprises a protrusion which protrudes from a reference face of the first surface of the metal plate and adjoins the second heat-producing electronic component to transmit the heat produced by the second heat-producing electronic component to the metal plate.

7. An electronic device comprising:

a circuit board unit; and a casing which stores the circuit board unit, wherein the circuit board unit comprises:

a circuit board, a heat-producing electronic component which is mounted on the circuit board and produces heat by consuming electric power, and a heat sink unit which is fixed to the circuit board and emits the heat produced by the heat-producing electronic component, wherein the heat sink unit comprises:

a cooling member including a metal plate having a plurality of attachment holes on edges thereof, a first surface of the metal plate adjoining a heat-producing electronic component, and a second surface of the metal plate having a plurality of cooling fins erected on an area other than the attachment holes, an attachment member including an opening in which the cooling fins are disposed when the cooling member is installed and a plurality of threaded bosses protruding from the first surface to be inserted into each of the attachment holes, and coil springs into which the bosses are respectively inserted, and wherein the coil springs are interposed between the attachment member and the metal plate, and the bosses are inserted into the attachment holes to fix the cooling member by screws.

8. The electronic device according to claim 7, wherein the circuit board is mounted with a circuit element that executes operational processing, and the casing is an enclosure of a main unit having a keyboard disposed on a top surface of the main unit, and the electronic device further comprises a display unit having a display screen and supported by the main unit so as to be opened and closed relative to the main unit.

* * * * *